United States Patent
Kim et al.

(10) Patent No.: US 7,487,256 B2
(45) Date of Patent: Feb. 3, 2009

(54) DYNAMIC MANAGEMENT METHOD FOR FORWARDING INFORMATION IN ROUTER HAVING DISTRIBUTED ARCHITECTURE

(75) Inventors: Byoung-Chul Kim, Yongin-si (KR); Se-Woong Moon, Seongnam-shi (KR); Byung-Gu Choe, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1219 days.

(21) Appl. No.: 10/724,085

(22) Filed: Dec. 1, 2003

(65) Prior Publication Data

US 2004/0111426 A1    Jun. 10, 2004

(30) Foreign Application Priority Data

Nov. 30, 2002    (KR) .................... 10-2002-0075701

(51) Int. Cl.
G06F 15/173    (2006.01)
(52) U.S. Cl. .................. 709/238; 709/242; 709/223
(58) Field of Classification Search ......... 709/238–242, 709/245, 223
See application file for complete search history.

(56) References Cited

U.S. PATENT DOCUMENTS

| | | | | |
|---|---|---|---|---|
| 4,868,743 A | * | 9/1989 | Nishio | ............. 707/3 |
| 5,202,986 A | * | 4/1993 | Nickel | ............. 707/3 |
| 5,509,006 A | | 4/1996 | Wilford et al. | |
| 5,629,930 A | | 5/1997 | Beshai et al. | |
| 5,959,968 A | | 9/1999 | Chin et al. | |
| 6,006,216 A | | 12/1999 | Griffin et al. | |
| 6,061,349 A | | 5/2000 | Coile et al. | |
| 6,067,574 A | * | 5/2000 | Tzeng | ............. 709/238 |
| 6,085,186 A | | 7/2000 | Christianson et al. | |
| 6,102,969 A | | 8/2000 | Christianson et al. | |
| 6,154,463 A | * | 11/2000 | Aggarwal et al. | ............. 370/408 |
| 6,246,669 B1 | * | 6/2001 | Chevalier et al. | ............. 370/238 |
| 6,298,061 B1 | | 10/2001 | Chin et al. | |
| 6,339,595 B1 | | 1/2002 | Rekhter et al. | |
| 6,400,681 B1 | | 6/2002 | Bertin et al. | |
| 6,449,354 B1 | | 9/2002 | Scott et al. | |
| 6,456,600 B1 | | 9/2002 | Rochberger et al. | |
| 6,473,408 B1 | | 10/2002 | Rochberger et al. | |
| 6,505,228 B1 | | 1/2003 | Schoening et al. | |
| 6,529,959 B1 | | 3/2003 | Armistead et al. | |
| 6,532,237 B1 | * | 3/2003 | Or et al. | ............. 370/396 |
| 6,546,391 B1 | * | 4/2003 | Tsuruoka | ............. 707/8 |
| 6,546,420 B1 | | 4/2003 | Lemler et al. | |
| 6,574,669 B1 | | 6/2003 | Weaver | |
| 6,584,093 B1 | | 6/2003 | Salama et al. | |

(Continued)

OTHER PUBLICATIONS

*BGP Table Data of Active BGP Entries and BGP Reports*, Report last updated at Tue, Nov. 25, 2003 4:1:12 UTC+1100, http://bgp.potaroo.net/.

Primary Examiner—Philip B Tran
(74) Attorney, Agent, or Firm—Robert E. Bushnell, Esq.

(57) ABSTRACT

A method for managing forwarding information in a router having a distributed architecture with a plurality of routing nodes. Forwarding information is dynamically aggregated, or disaggregated, in response to an addition or a deletion of forwarding information, so that the size of the forwarding tables managed by the routing nodes of the router are reduced. The transmission of control packets being transmitted to update the forwarding tables is reduced; consequently internal traffic is also reduced.

33 Claims, 23 Drawing Sheets

U.S. PATENT DOCUMENTS

| | | |
|---|---|---|
| 6,643,292 B2 | 11/2003 | Chapman et al. |
| 6,650,641 B1 | 11/2003 | Albert et al. |
| 6,665,683 B1 * | 12/2003 | Meltzer ...................... 707/101 |
| 6,973,057 B1 * | 12/2005 | Forslow ...................... 370/328 |
| 7,027,449 B2 * | 4/2006 | Garcia-Luna-Aceves et al. ......................... 370/401 |
| 2002/0147842 A1 * | 10/2002 | Breitbart et al. ............. 709/241 |

* cited by examiner

NUMBER OF ENTRIES IN FORWARDING TABLE

BGP4 FLAP CONVERGENCE TIME TEST

```
Insertion (prefix) {
  local insertionnode
  /* STEP1 */
  insertionnode := FindNode(prefix)
  /* STEP2 */
  /* Check new route's nexthop */
  if (NodeNexthopVirtual(insertionnode) = TRUE) then
     InsertionNodeVirtual(insertionnode)
  else
     InsertionNodeInter-domain(insertionnode)
  /* STEP3 */
  if (run_step3 = TRUE) then
     ChildNodeHandler(insertionnode)
}
```

FIG.14A

```
Deletion (prefix) {
  local deletenode, siblingnode
  /* STEP1 */
  deletenode := FindNode(prefix)
  /* STEP2 */
  if (DRNForward(deletenode) = TRUE) then
     if (ForwardingTableForward(deletenode) = TRUE)
        then
           DeleteForwardingTable(deletenode)
           SendDRN(deletenode)
        else
           /* Deletion of the parent node instead of */
           /* the deletenode                         */
           DeleteForwardingTable(GetParent(deletenode))
  else
     /* In case of the deletion of the aggregation node, */
     /* sending information to DRN can be suppressed */
     if (ForwardingTableForward(deletenode) = TRUE)
        then
           DeleteForwardingTable(deletenode)

siblingnode := SiblingNodeCheck(deletenode)
  / * Delayed insertion of the sibling node */
  if (siblingnode ≠ NIL) then
     SendDRN(siblingnode)
  /* STEP3 */
  ChildNodeHandler (deletenode)
}
```

FIG.14B

```
FindNode (prefix) {
  local node
  /* Search for node to be inserted */
  node := GetNode (prefix)
  /* Identify the insertion node */
  if ((node ? NIL) and (NodeType(node) = AGG)) then
      Empty (node)
      run_step3 := TRUE
  else
      NewNode(node)
  return (node)
}
```

FIG. 14C

```
MakeParentNode (node) {
  local parentnode
  /* Make parent node and set node type to AGG */
  parentnode := AllocateParentNode(node)
  NodeType(parentnode) := AGG
  Parent(node) := parentnode
  return(parentnode)
}
```

FIG. 14D

```
InsertNodeVirtul (node) {
  local parentnode
  parentnode := GetParent(node)
  if (parentnode ? NIL) then
    if (NodeSource(parentnode) ? NodeSource(node)) then
            InsertForwardingTable(node)
    /* There is not parent node. */
  else
    /* Make and wirte parent node to the forwarding table */
        parentnode := MakeParentNode(node)
        InsertForwardingTable(parentnode)
}
```

FIG.14E

```
InsertNodeInter-domain (node) {
  local parentnode
  parentnode := GetParent(node)
  if (parentnode ? NIL) then
        /* If new route source and parent are same, */
        /* new route sending to DRN can be suppressed */
    if (NodeSource(parentnode) ? NodeSource(node)) then
            SendDRN(node)
        InsertForwardingTable(node)
  else
        /* Make parent node and wirte new node */
  /* to the forwarding table */
        parentnode := MakeParentNode(node)
        InsertForwardingTable(node)
        SendDRN(node)
}
```

FIG.14F

ForwardingTableForwardCheck(node)
{
  local parentnode
  parentnode := *GetParent*(node)
  if ((*ForwardingTableForward*(node) = FALSE)
  and (*NodeSource*(node) != *NodeSource*(parentnode))) then
      return (FALSE)
  else
      return (TRUE)
}

FIG.14G

DRNForwardCheck(node)
{
  local parentnode
  parentnode := *GetParent*(node)
  if ((*DRNForward*(node) = FALSE)
    and (*NodeNexthopVirtual*(node) = FALSE)) then
      return (FALSE)
  else
      return (TRUE)
}

FIG.14H

```
ChildNodeHandler (node) {
local leftchild, rightchild
leftchild := GetLeftChildNode(node)
rightchild := GetRightChildNode(node)
if (leftchild ? NIL) then
    /* Disaggregation of the leftchild node */
    if ((ForwardingTableForwardCheck(leftchild) = FALSE)  then
        InsertForwardingTable(leftchild)
    /* Delayed insertion of the leftchild node */
    if ((DRNForwardCheck(leftchild) = FALSE) then
        SendDRN(leftchild)
if (rightchild ? NIL) then
    /* Disaggregation of the rightchild node */
    if ((ForwardingTableForwardCheck(rightchild) = FALSE) then
        InsertForwardingTable(rightchild)
    /* Delayed insertion of the rightchild node */
    if ((DRNForwardCheck(rightchild) = FALSE) then
        SendDRN(rightchild)
}
```

FIG. 14I

```
SiblingNodeCheck (node) {
    local siblingnode
    siblingnode := GetSiblingNode(node)
    /* Check if there is aggregated sibling node */
    if ((NodeSource(node) = NodeSource(siblingnode))
            and (DRNForward(siblingnode) = FALSE)) then
        return (siblingnode)
    else
        return (FALSE)
}
```

FIG.14J

DYNAMIC MANAGEMENT METHOD FOR FORWARDING INFORMATION IN ROUTER HAVING DISTRIBUTED ARCHITECTURE

CLAIM FOR PRIORITY

This application makes reference to, incorporates the same herein and claims priority under 37 CFR §119 to an application entitled Dynamic Management Method For Forwarding Information In Router Having Distributed Architecture filed in the Korean Intellectual Property Office on the 30 of Nov. 2002 and there assigned Serial No. 2002-75701, the contents of which are hereby incorporated by reference.

BACKGROUND OF THE INVENTION

1. Field of the Invention

The present invention relates to a method for managing the forwarding of information in a router having a distributed architecture, and more particularly, to a method for dynamically managing the forwarding of information created in a router having a distributed architecture by aggregating or disaggregating forwarding information.

2. Description of the Related Art

Recently, as mass-storage very high speed networks have been developed, router architecture has begun to change from a centralized architecture to a distributed architecture.

A router having a centralized architecture uses a routing protocol in a central processor that is capable of managing routing information collected by the routing protocol. For instance, with a router having a centralized architecture, the central processor calculates routing tables and distributes the routing tables into each line card. Thus, packet forwarding of the line card is carried out based on routing table information transferred from a processor of a central router.

On the contrary, a router having a distributed architecture distributes work to a plurality of processors without concentrating work on the central processor. Thus, a router having a distributed architecture can process relatively greater masses of storage data as compared with a router having a centralized architecture. For example, a router having a distributed architecture includes a first processor for managing the routing protocol, a second processor for calculating the routing table, and a third processor for managing the packet forwarding. That is, work is distributed across the first, second and third processors in an effort to improve routing performance.

A router constructed with a distributed architecture includes a plurality of routing nodes connected to each other through a switching module.

Routing nodes have a routing table for supporting a sub-network and a processor for processing a routing protocol. In addition, each of the routing nodes runs a unique routing protocol and performs a unique forwarding function, even though these routing nodes are regarded as one router in the eyes of a user. These routing nodes are connected to each other through the switching module so as to globally manage routing tables of other routing nodes.

Each input/output processor for each routing mode is divided into a system processor area and a network processor area. The system processor area includes the routing protocols, and a routing table, and the network system processor area includes a forwarding table. The system processor area collects routing information, manages the forwarding table by calculating a route, and enables each input/output processor to share the routing table with the other input/output processors. The network processor forwards work between network devices provided in the local area based on the forwarding table. Thus, a router having distributed architecture can rapidly process masses of stored data.

In order to rapidly process masses of stored data in the distributed architecture of the router, forwarding tables managed by each routing node of the router must be recognized by the other routing nodes within the distributed architecture of the router. A conventional router with distributed architecture transmits forwarding tables between routing nodes through the switching module in such a manner that forwarding tables of routing nodes can be globally managed in each routing node. For example, if the router has ten routing nodes, and each of these ten routing node has ten thousand forwarding entries, then each routing node must manage 100,000 forwarding entries (10×10,000). Accordingly, a conventional router having a distributed architecture requires a large storage capacity in order to store the forwarding tables, thus concomitantly incurring a substantial overhead in required storage capacity.

SUMMARY OF THE INVENTION

Accordingly, the present invention has been made to solve the above-mentioned problems occurring in the art, and a first object of the present invention is to provide a method for reducing the sizes of a forwarding tables managed by each routing node of a router constructed with a distributed architecture.

A second object of the present invention is to reduce internal traffic by reducing transmission of control packets that are transmitted in order to update a forwarding table in a router constructed with a distributed architecture.

A third object of the present invention is to provide a method for dynamically managing forwarding information in response to an addition or a deletion of routing information in a router having a distributed architecture, by aggregating or disaggregating forwarding information.

In order to accomplish these and other objects, there is provided a method for managing the forwarding information in a router constructed with a distributed architecture including a plurality of routing nodes, by forming an aggregation tree corresponding to each routing node, with the aggregation tree including nodes corresponding to forwarding information for each of the routing nodes and virtual nodes for aggregating forwarding information for each of the routing nodes; varying the aggregation tree when forwarding information is added to each of the routing nodes; identifying the creation area of forwarding information added to each of the routing nodes; making an analysis of the aggregation tree, advertising forwarding information to other routing nodes based on the analysis, and storing forwarding information in a local forwarding table of a corresponding routing node when the forwarding information is created in a local area of the corresponding routing node; and making an analysis of the aggregation tree, and storing forwarding information in the local forwarding table of the corresponding routing node based on the analysis when forwarding information is not created in the local area of the corresponding routing node.

In order to accomplish these and other objects, according to another aspect of the present invention, there is provided a method for managing forwarding information in a router constructed with a distributed architecture including a plurality of routing nodes, by forming an aggregation tree corresponding to each routing node, with the aggregation tree including nodes corresponding to forwarding information for each of the routing nodes and virtual nodes for aggregating forwarding information of each of the routing nodes; making an analysis of the aggregation tree of each of the routing nodes in response to a deletion of forwarding information in each routing node and identifying the creation area of deleted forwarding information; advertising the deletion of forwarding information to other routing nodes only when the deleted forwarding information is advertised to other routing nodes by analyzing the aggregation tree when deleted forwarding information is created in a local area of the corresponding routing node, deleting the node corresponding to deleted forwarding information from the aggregation tree, and deleting forwarding information from a local forwarding table of the corresponding routing node; and deleting the node corresponding to forwarding information from the aggregation tree when deleted forwarding information is not created in the local area of the corresponding routing node.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 14A through 14J are views showing algorithms of a dynamic management method for forwarding information according to one embodiment of the present invention.

DETAILED DESCRIPTION OF THE PREFERRED EMBODIMENT

Figure 1:
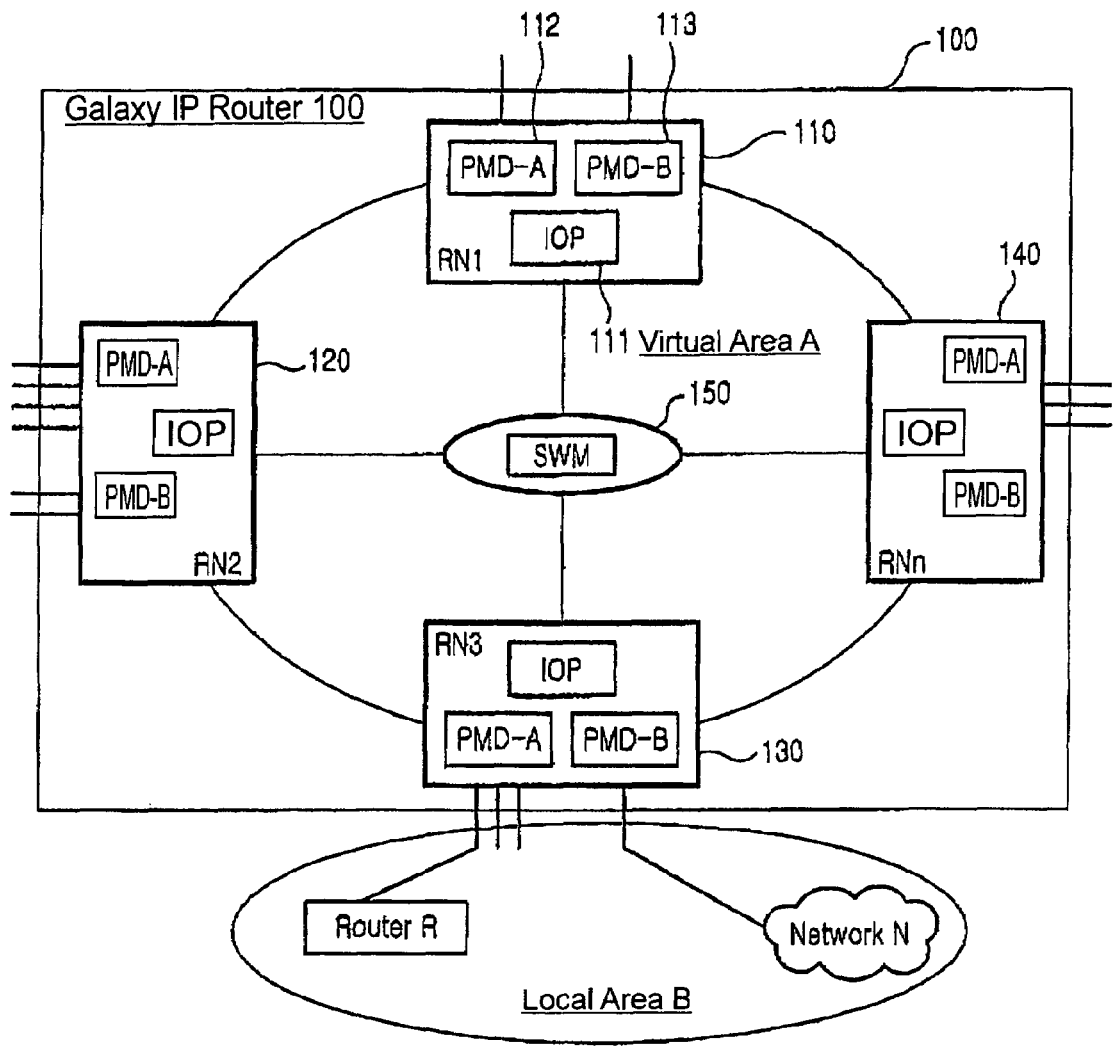
FIG. 1 is a schematic block diagram illustrating a router having a distributed architecture.

Hereinafter, a preferred embodiment of the present invention will be described with reference to the accompanying drawings. In the following description of the present invention, the same reference numerals are used to designate the same or similar components. It will be understood by those skilled in the art that the present invention is not limited to specific elements, such as circuit devices, described in the following description. A detailed description of known functions and configurations incorporated herein will be omitted when it may obscure the subject matter of the present invention.

FIG. 1 is a schematic block diagram of a router 100 having a distributed architecture. The router illustrated in FIG. 1 is a galaxy IP router.

Referring to FIG. 1, the distributed architecture of router 100 includes a plurality of routing nodes 110, 120, 130 and 140 connected to each other through a switching module 150. In addition, an input/output processor 111 is mounted on each of routing nodes 110, 120, 130 and 140. Input/output processor 111 is designed to receive a packet from two physical medium devices 112 and 113.

Each of routing nodes 110, 120, 130 and 140 has a routing table for supporting a sub-network and a processor for processing routes. In addition, each of routing nodes 110, 120, 130 and 140 runs a unique routing protocol and performs a unique forwarding function. Routing nodes 110, 120, 130 and 140 however, are regarded as one router from the view of a user. Routing nodes 110, 120, 130 and 140 are connected to each other through switching module 150 so as to globally manage routing tables of other routing nodes. A physical sub-network connected to one of the routing nodes 110, 120, 130 and 140 is defined as a local area B, and a network formed by the routing nodes 110, 120, 130 and 140 connected to each other through the SWM 150 is defined as a virtual area A.

Figure 2:
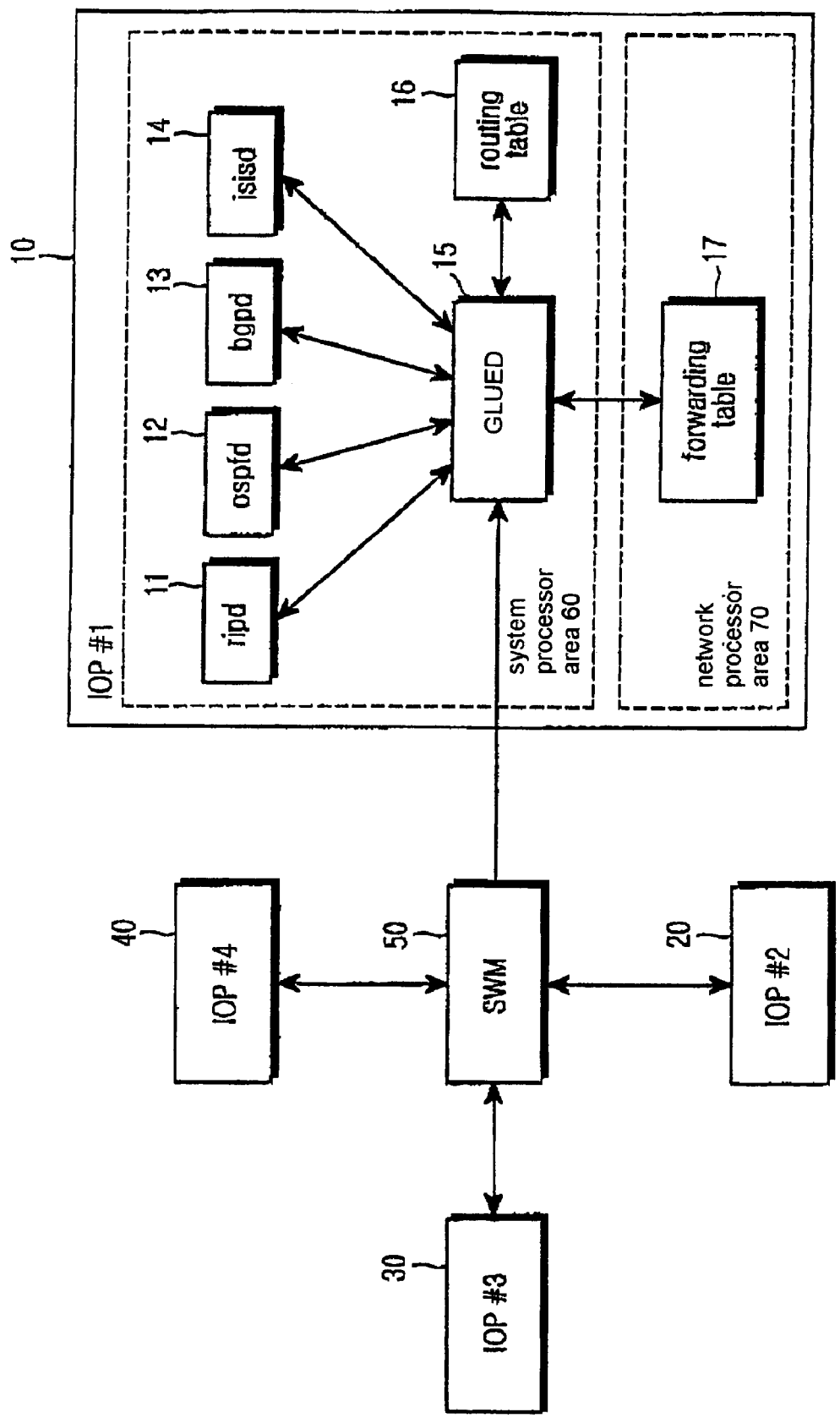
FIG. 2 is a schematic block diagram showing conventional process architecture of a router having distributed architecture.

FIG. 2 is a schematic block diagram showing a conventional process architecture of router 100 with its distributed architecture, and particularly, the process architecture of an IOP 10, 20, 30, 40 mounted on each routing node of router 100 is constructed with a distributed architecture including four routing nodes. IOP#1 10, IOP#2 20, IOP#3 30 and IOP#4 40 are connected to each other through switching module 50 (i.e., SWM).

Referring to FIG. 2, IOP#1 10 includes a plurality of routing protocols, such as ripd 11, ospfd 12, bgpd 13 and isisd 14, GLUED (galaxy loosely unified environment daemon) 15, routing table 16 and forwarding table 17.

The routing protocols, such as ripd 11, ospfd 12, bgpd 13 and isisd 14, collect routing information according to their intrinsic collection functions. Routing table 16 stores routing information collected by the routing protocols, such as ripd 11, ospfd 12, bgpd 13 and isisd 14. Forwarding table 17 stores forwarding information obtained by calculating routing information stored in routing table 16.

GLUED 14, which is an IOP management processor, stores routing information collected by the routing protocols, such as ripd 11, ospfd 12, bgpd 13 and isisd 14, in routing table 16 and stores the forwarding information obtained by calculating routing information in forwarding table 17. GLUED 14 also manages routing information and forwarding information. In addition, GLUED 14 advertises the routing information obtained from routing table 16 to IOP#2 20, IOP#3 30 and IOP#4 40 through SWM 50.

IOP#1 10 is divided into system processor area 60 and network processor area 70. System processor area 60 includes the routing protocols, such as ripd 11, ospfd 12, bgpd 13 and isisd 14, GLUED 15 and routing table 16. System network processor area 70 includes forwarding table 17. System processor area 60 collects routing information, manages forwarding table 17 by calculating routes, and performs a predetermined process that enables IOP#1 10 to share routing table 16 with IOP#2 20, IOP#3 30 and IOP#4 40. Network processor area 70 performs forwarding work between network devices provided in the local area based on the information provided by forwarding table 17. Thus, a router having a distributed architecture can rapidly process masses of stored data.

Figure 3:
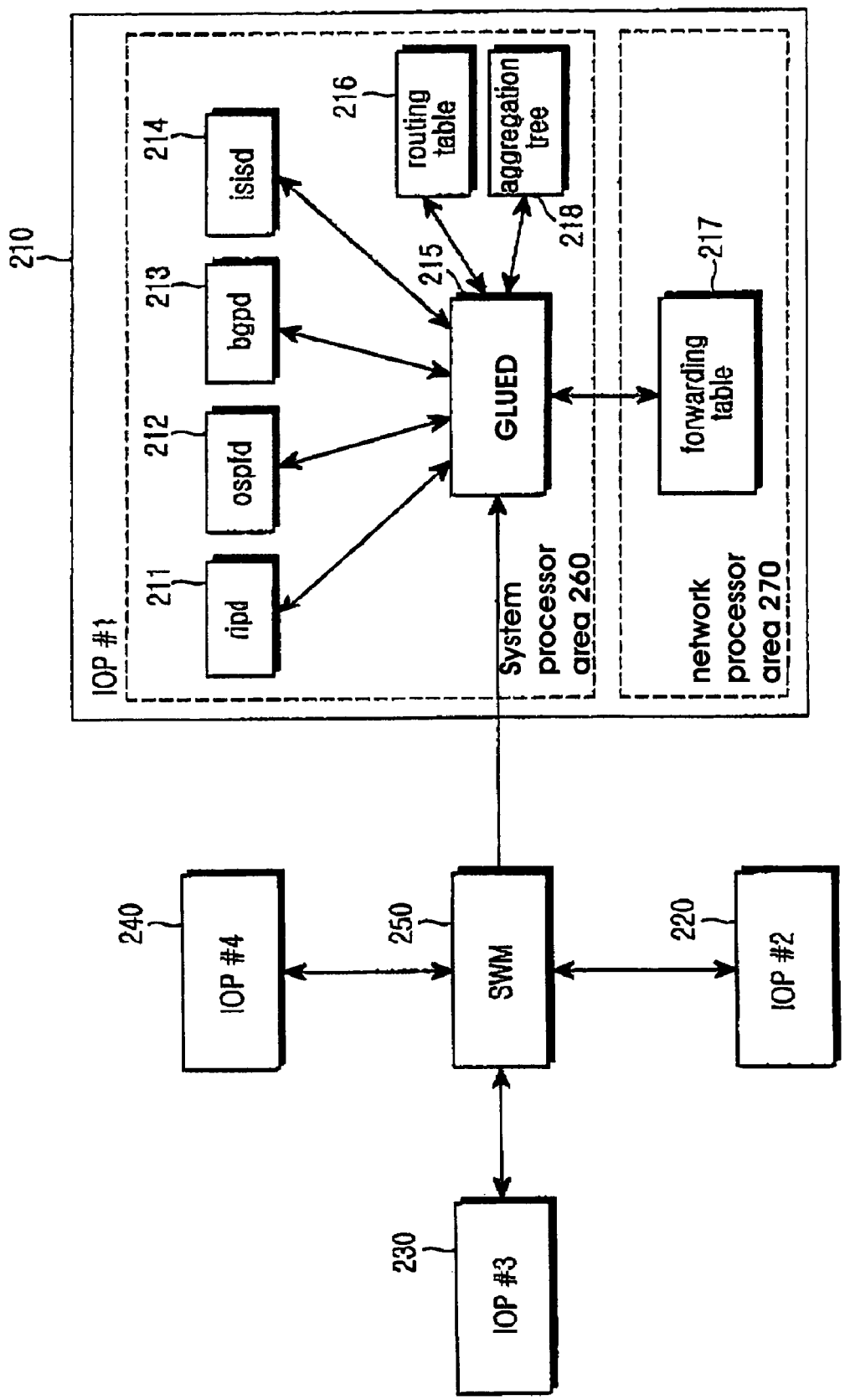
FIG. 3 is a schematic block diagram showing the process architecture of a router having distributed architecture, for managing forwarding of information according to one embodiment of the present invention.

As shown in FIGS. 1 and 2, in order to rapidly process masses of stored data in router 100 constructed with a distributed architecture, forwarding tables managed by one routing node of router 100 must be recognized from other routing nodes of router 100. To this end, conventional router 100 having a distributed architecture transmits forwarding tables between routing nodes through the SWM switching module in such a manner that forwarding tables of routing nodes can be globally managed within each routing node. For example, if router 100 has ten routing nodes, and each of ten routing nodes has ten thousand forwarding entries, each routing node must manage 100,000 forwarding entries (10×10,000). Accordingly, a conventional router 100 having a distributed architecture necessarily requires a large capacity for the storage of forwarding tables, which concomitantly incurs an undesirable overhead in packet forwarding FIG. 3 is a schematic block diagram showing the process architecture of a router constructed with a distributed architecture, for managing forwarding information according to one embodiment of the present invention. The process architecture of this distributed architecture router has aggregation tree 218 as a constituent component of system processor area 260 for IOP#1 210. Generally, an aggregation signifies an encapsulation of parts of an architecture or a composition. Thus, aggregation tree 218 includes nodes corresponding to the forwarding information, which is managed by various IOP's including IOP#1 210, IOP#2 220, IOP#3 230, and IOP#4 240, and a virtual node for aggregating the forwarding information.

Figures 4A, 4B:
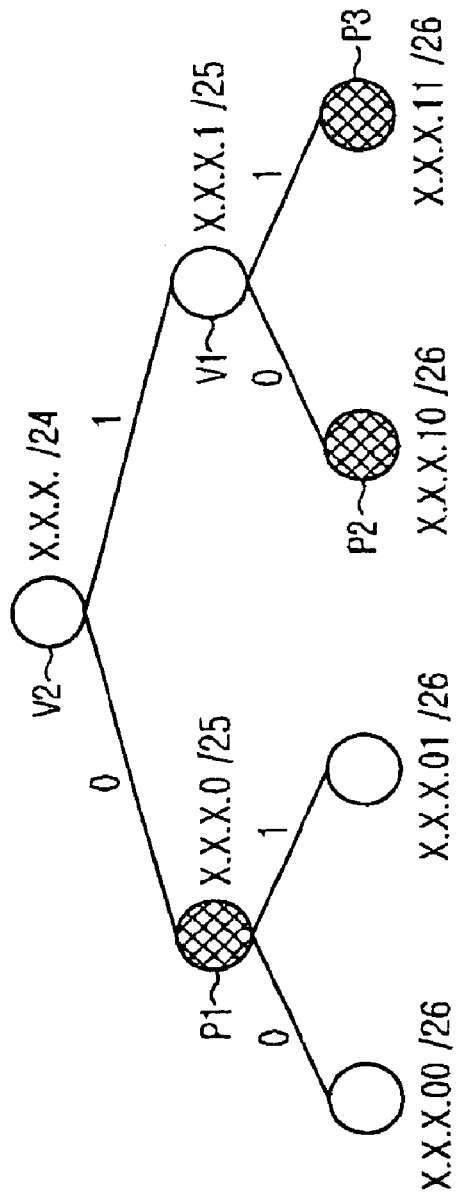
FIG. 4A is a diagram showing the management data architecture for each node of an aggregation tree created for managing the forwarding of information according to one embodiment of the present invention.
FIG. 4B is a diagram showing an architecture of an aggregation tree created for managing forwarding information according to one embodiment of the present invention.

Considering now FIGS. 4A and 4B together with FIG. 3, for instance, when the IOP#1 210 has forwarding information including P1=0101101 and P2=0101100, IOP#2 220, IOP#3 230, and IOP#4 240 can obtain forwarding information about P1 and P2 based on the forwarding information about virtual P3=010100, which is representative of P1 and P2. Thus, IOP#2 220, IOP#3 230, and IOP#4 240 do not require forwarding information about P1, P2 in order to manage the forwarding information of P1 and P2. That is, IOP#2 220, IOP#3 230, and IOP#4 240 only manage forwarding information about virtual P3=010110. Therefore, IOP#1 210 adds nodes corresponding to forwarding information about P1 and P2 and a virtual node corresponding to P3 for aggregating P1 and P2 in aggregation tree 218. In addition, IOP#1 210 advises IOP#2 220, IOP#3 230, and IOP#4 240 about the forwarding information for P3, instead of the forwarding information for P1 and P2.

If IOP#1 210 has the forwarding information including only P1=0101101 and advises IOP#2 220, IOP#3 230, and IOP#4 240 about the forwarding information for P1, IOP#2 220, IOP#3 230, and IOP#4 240 create a virtual node corresponding to P3=010110 for aggregating P1, and add P1 and P3 to each aggregation tree thereof. In addition, the forwarding information for P3 is added to each of the local forwarding tables of IOP#2 220, IOP#3 230, and IOP#4 240. In this case, it is not required for IOP#2 220, IOP#3 230, and IOP#4 240 to add the forwarding information for P2 to each of their aggregation trees and each of their local forwarding tables, even if the forwarding information for P2=0101100 is added to IOP#1 210. This is because the forwarding information for P2 can be found based on P3, which is preliminarily stored. Forwarding table 217 is included within the network processor area 270.

After P1 has been added to IOP#1 210, IOP #1 210 advises IOP#2 220, IOP#3 230, and IOP#4 240 about the forwarding information for P1. Then, P2 is added to IOP#1 210 and P1 is deleted from IOP#1 210. In this case, IOP#1 210 advises IOP#2 220, IOP#3 230, and IOP#4 240 about the deletion of P1. If the IOP#2 220, IOP#3 230, and IOP#4 240 however, simply delete P1 and P3 stored in their aggregation trees in response to being advised by IOP #1 210 about the deletion of information for P1, IOP#2 220, IOP#3 230, and IOP#4 240 may lose their forwarding information about P2. Thus, in order to prevent the loss of forwarding information about P2, IOP#1 210 advises IOP#2 220, IOP#3 230, and IOP#4 240 of the forwarding information about P2 after advising IOP#2 220, IOP#3 230, and IOP#4 240 about the deletion of information for P1. Upon receiving the forwarding information about P2, IOP#2 220, IOP#3 230, and IOP#4 240 add P2 to their aggregation trees and create a virtual node of P3 in order to also add P3 to their aggregation trees and local forwarding tables. This procedure is called "disaggregation".

Aggregation tree 218 is provided to support these aggregation and disaggregation procedures. Since the other constituent components shown in FIG. 3 are substantially identical to parts shown in FIG. 2, they do not need to be again described below.

FIG. 4A is a table showing the management data architecture for each node of the aggregation tree created for managing the forwarding information according to one embodiment of the present invention. Each node of the aggregation tree includes a prefix, which is address information for receiving forwarding information, length information about the prefix, the type of the forwarding information, an identification of the source IOP that created the forwarding information, an IOP flag to indicate whether or not the forwarding information has been advertised to the other routing nodes of the router, and an FT flag to indicate whether or not the forwarding information is stored in the local forwarding table. This management data is updated together with the aggregation trees.

The type of forwarding information "Type", signifies the nature of the routing protocols that create the forwarding information in the IOP. The routing protocols include BGP, SDPF and RIP. An AGG type virtual node is used in order to distinguish the virtual node from the actual forwarding information. The AGG type of virtual node has an inferior priority about the forwarding information as compared with BSP, SDPF and RIP types of routing protocols. That is, since the virtual node is virtual forwarding information, actual forwarding information provided by the routing protocols has a superior priority to an AGG type virtual node.

In order to determine the type of forwarding information, routing nodes firstly check the area of creation of the forwarding information. Then, if the forwarding information was created in a local area, the type of the forwarding information is determined based on the nature of the processors that created the forwarding information. In addition, if forwarding information is created from a virtual area, virtual type forwarding information is stored as the type of the forwarding information. Accordingly, after analyzing the prefix of the forwarding information, the routing nodes determine that the forwarding information was transferred from the virtual area if the prefix of the forwarding information is a private IP (Internet protocol) address. Otherwise, the routing nodes determine that forwarding information was created from the local area.

A private IP address indicates an address that is available in a predetermined local network. The private IP address is used to distinguish nodes provided in the local network from one another. Accordingly, a private IP address is not available in an external area of the local network. Generally, a router having a distributed architecture allots the private IP address to each routing node provided in the router so as to distinguish routing nodes from each other. According to the present invention, the area of the creation of the forwarding information can be determined from the private IP address.

FIG. 4B is a diagram showing an architecture of an aggregation tree created for managing forwarding information according to one embodiment of the present invention. Circular nodes identified by cross-hatching only represent forwarding information managed by a predetermined routing node. As is indicated by FIG. 4B, the routing node manages forwarding information for P1, P2 and P3 having forwarding addresses P1=X.X.X.0, P2=X.X.X.10, and P3=X.X.X.11. P2 and P3 can be aggregated with a first virtual node V1 having a forwarding address of "X.X.X.1". In addition, P1 and the virtual node V1 can be aggregated with a second virtual node V2 having a forwarding address of "X.X.X.". Thus, the routing node advertises only the second node V2 to the virtual area. In addition, the other routing nodes store only one node V2 in their local forwarding tables while achieving an effect identical to the storage of the forwarding information for P1, P2 and P3 in their local forwarding tables.

Figure 4C:
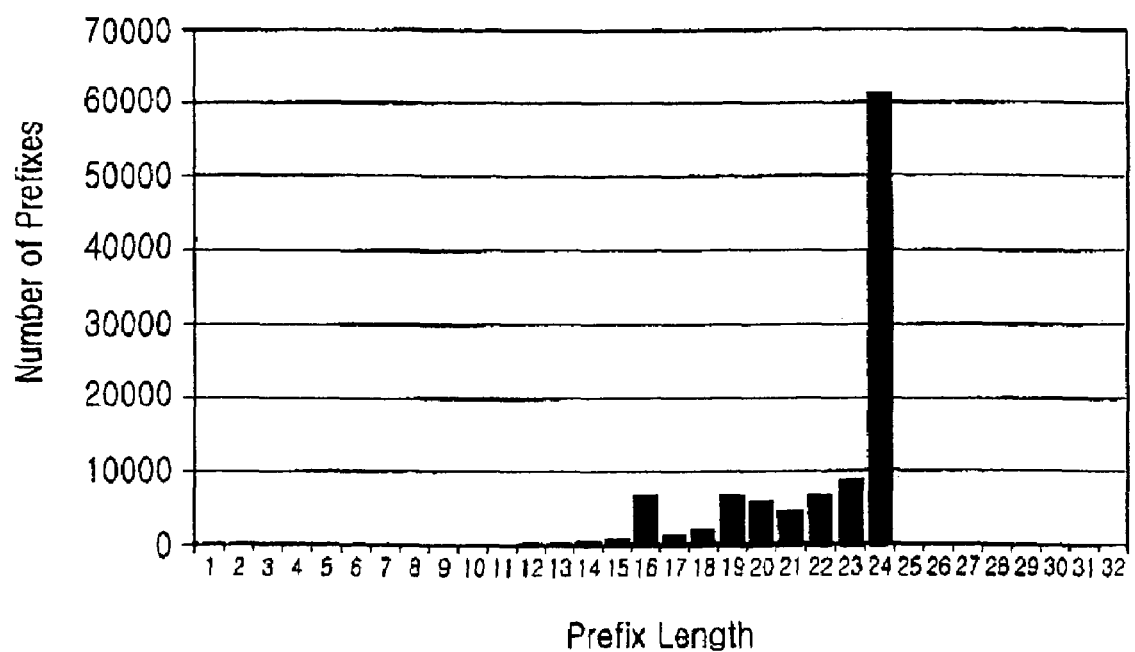
FIG. 4C is a graph representing a distribution of prefixes as a function of length thereof.

As shown in FIG. 4B, the forwarding address of the virtual node is determined by excising the leastmost one's bit from the forwarding address of the forwarding information for a child node of the virtual node. For example, the forwarding address of the first virtual node V1 aggregating P2 and P3 is determined as "X.X.X.1" by excepting the leastmost one's bit from forwarding addresses of P2 and P3 (P2=x.x.x.10 and P3=x.x.x.11). According to the present invention, the aggregation may be carried out only between a parent node and a child node of the aggregation tree, because it is possible to obtain a sufficient aggregation effect of the forwarding information through the aggregation between the parent node and the child node in order to sufficiently reduce the overhead when performing the aggregation of the forwarding information. That is, the reason for performing the aggregation between only the child node and the parent node of the aggregation tree is that the routing entries of a real border gateway protocol (i.e., a BGP) core routing table, which is used for inspecting the performance of the present invention, are concentrated on a point having a prefix length of "24" as is shown in FIG. 4C, so that it is possible to obtain a sufficient effect from the aggregation even if the aggregation is carried out between only the child node and the parent node.

Figure 5:
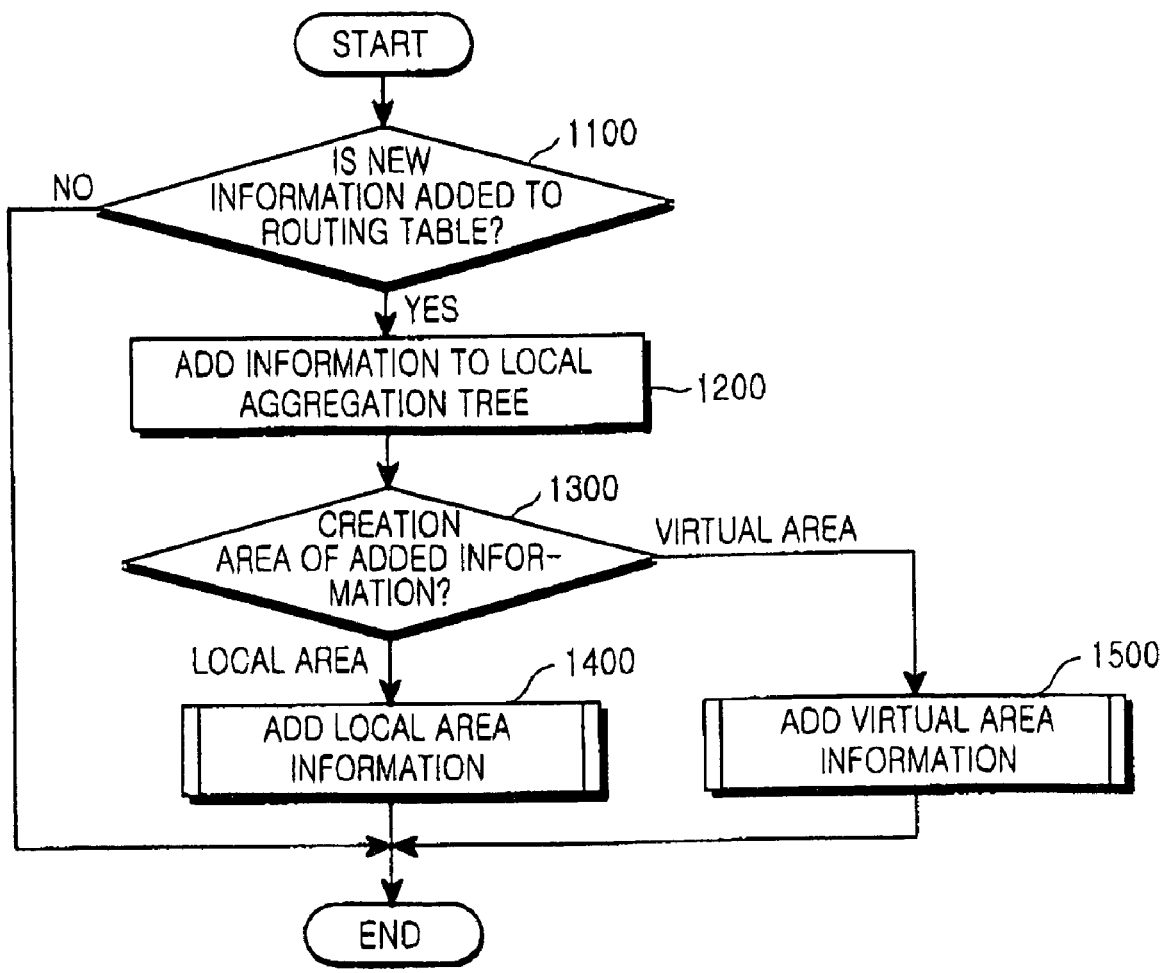
FIG. 5 is a flow chart showing a method for managing newly added forwarding information according to one embodiment of the present invention.

FIG. 5 is a flow chart showing a method for managing newly added forwarding information according to one embodiment of the present invention. When new forwarding information is added to a predetermined routing node of a router having a distributed architecture with a plurality of routing nodes in step 1100, the predetermined routing node adds the forwarding information to a local aggregation tree in step 1200. At this time, the local aggregation tree has a data architecture including nodes corresponding to the forwarding information for each routing node, and virtual nodes for performing the aggregation of the forwarding information for routing nodes. Accordingly, adding forwarding information to the local aggregation tree during step 1200 means that a new node is added to the aggregation tree. The property of a new node added to the aggregation tree is determined on the basis of the data architecture as shown in FIGS. 4A and 4B.

Then, the creation area of the forwarding information added to the routing node in step 1100 is checked in step 1300 so as to process the forwarding information on the basis of the creation area of the newly added forwarding information. For instance, if the forwarding information added to the routing node in step 1100 is created in the local area, local area information is added in step 1400. In addition, if the forwarding information added to the routing node during step 1100 is created from the virtual area, virtual area information is added in step 1500. The local area includes routing information and a sub-network, which are physically connected to each routing node, and the virtual area includes a network area, which is virtually formed with the routing nodes connected to each other. Generally, a private IP address is used in the virtual area in order to distinguish routing nodes from each other. Thus, it is preferred to check in step 1300, whether or not the address of forwarding information is a private IP address in order to find the creation area of the forwarding information added to the routing node in step 1100. If the address of the forwarding information added to the routing node in step 1100 is a private IP address, then it will be determined that the forwarding information was created in the virtual area. In addition, if the address of the forwarding information added to the routing node in step 1100 is not a private IP address, it is determined that the forwarding information is created in the local area.

Based on the results of steps 1400 and 1500, the property of each node that is included in the aggregation tree will vary. For example, when information for the node added to the local aggregation tree in step 1200 is stored in the local forwarding table after advertising the information from the node to the virtual area in step 1400, values of the IOP flag and FT flag referred to in FIG. 4A are changed to "yes". In addition, if information for the node added to the local aggregation tree in step 1200 is stored in the local forwarding table without advertising the addition of the forwarding information to the node to the virtual area in step 1500, the value of the FT flag (referred to in FIG. 4A) is only changed to "yes".

Figure 6:
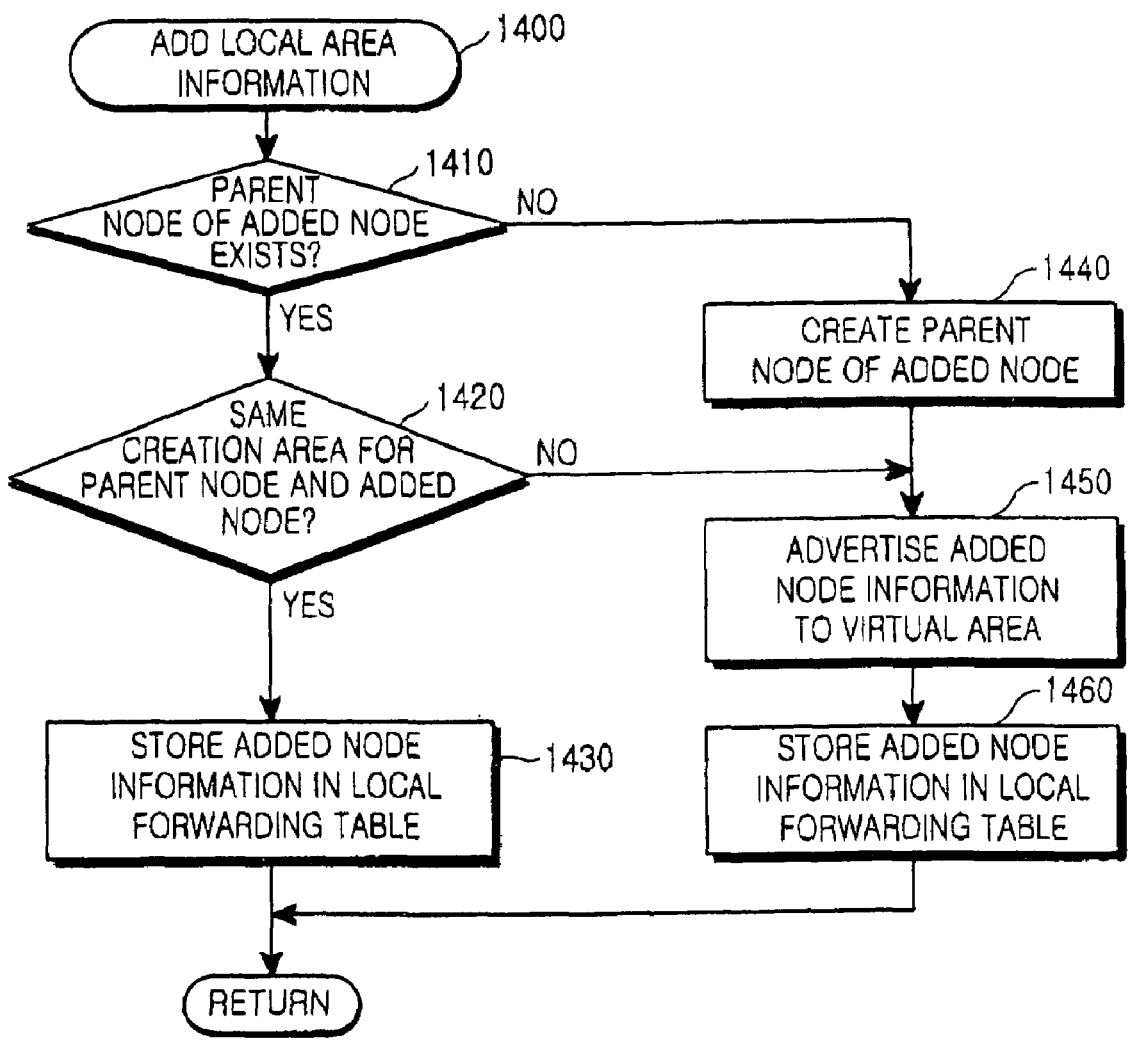
FIG. 6 is a flow chart showing a procedure for adding local area information according to one embodiment of the present invention.
Figure 7:
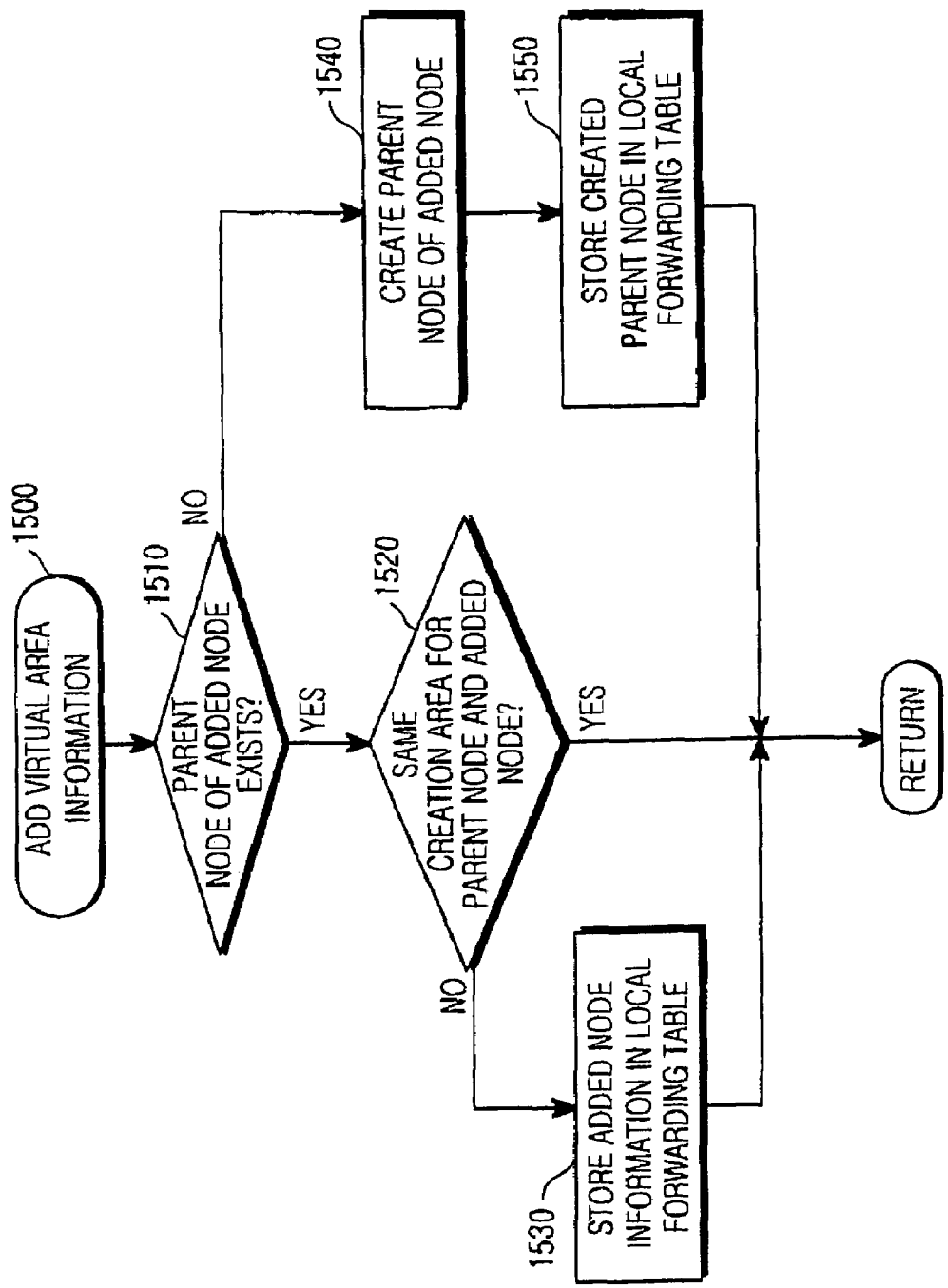
FIG. 7 is a flow chart showing a procedure for adding virtual area information according to one embodiment of the present invention.

FIGS. 6 and 7 are flow charts showing the procedures for adding local area information pursuant to step 1400 and virtual area information pursuant to step 1500, respectively, according to one embodiment of the present invention.

Referring to FIGS. 6 and 7 collectively, according to the procedure for adding local area information to the aggregation tree in step 1400, a determination is first made in step 1410 about whether or not a parent node of the node added to the aggregation tree in step 1200 exists in the aggregation tree. Then, in step 1420 a determination is made about whether or not the creation area of the node added to the aggregation tree in step 1200 is identical to the creation area of the parent node. That is, step 1420 determines whether or not the node added to the aggregation tree in step 1200 and the parent node were created by the same routing node. Then, based on the above determination, it is determined whether or not the forwarding information added to the routing node in step 1100 is advertised to other routing nodes.

That is, when the parent node of the node added to the aggregation tree in step 1200 exists in the aggregation tree, if the node and the parent node have been created by the same routing node in step 1430, the routing node stores only the forwarding information added to the routing node in step 1100 in the local forwarding table without advising other routing nodes about the forwarding information. In this case, an aggregation effect is expected. That is, since the routing node does not advise other routing nodes about newly added forwarding information, the number of transmissions of control-packets is reduced and the management algorithm is relatively simplified.

In addition, when the parent node of the node added to the aggregation tree in step 1200 exists in the aggregation tree, if the node and the parent node have been created by different routing nodes, during step 1460 the routing node stores the forwarding information added to the routing node in step 1100 in the local forwarding table, after advising other routing nodes of the forwarding information in step 1450.

If step 1400 determines that the parent node of the node added to the aggregation tree in step 1200 does not exist in the aggregation tree, in step 1440 the routing node creates the parent node of the node added to the aggregation tree then, in step 1450 advises the other routing nodes about the forwarding information added to the routing node in step 1100, and in step 1460 stores the forwarding information in the local forwarding table of the routing node.

The parent node represents virtual forwarding information, and forwarding address information of the parent node is determined by excising the lowermost one's bit from the forwarding address information (i.e., excising the one's bit from the prefix of the forwarding address information) for the node added to the aggregation tree in step 1200. In addition, the routing node that created the parent node is preferably identical to the routing node that created the node added to the aggregation tree in step 1200.

Referring now collectively to FIGS. 5 through 7, a procedure for adding virtual area information in step 1500 includes step 1510 of determining whether or not the parent node of the node added to the aggregation tree in step 1200 exists in the aggregation tree, and step 1520 of determining whether or not the creation area of the node is identical to the creation area of its parent node. That is, it is determined whether or not the node added to the aggregation tree in step 1200 and the parent node of that added node are created by the same routing node. Then, based on this determination, it is determined whether or not forwarding information added to the routing node in step 1100 should be advertised to the other routing nodes.

That is, when step 1510 establishes that the parent node of the node added to the aggregation tree in step 1200 exists in the aggregation tree, if step 1520 subsequently establishes that the node and the parent node were created by the same routing node, that routing node does not store the forwarding information newly added to the routing node during step 1100 to its local forwarding table. In this case, an aggregation effect is expected. That is, even if new forwarding information is added to other routing nodes, if a virtual node (and its parent node), which is representative of forwarding information, exists in the routing node, the new forwarding information is not added to the local forwarding table, so that a size of the local forwarding table for the routing node can be reduced.

In addition, when the parent node of the node added to the aggregation tree in step 1200 exists in the aggregation tree, if step 1520 establishes that the node and the parent node are created by different routing nodes in step 1530, the routing node stores the new forwarding information added to the routing node in step 1100 to the local forwarding table.

If step 1510 establishes that the parent node of the node added to the aggregation tree in step 1200 does not exist in the aggregation tree, then in step 1540 the routing node creates the parent node of the node added to the aggregation tree, and in step 1550 stores the forwarding information created in the local forwarding table of the routing node. The procedure for creating the parent node has been described with reference to FIG. 6, and need not be further described below.

Figure 8:
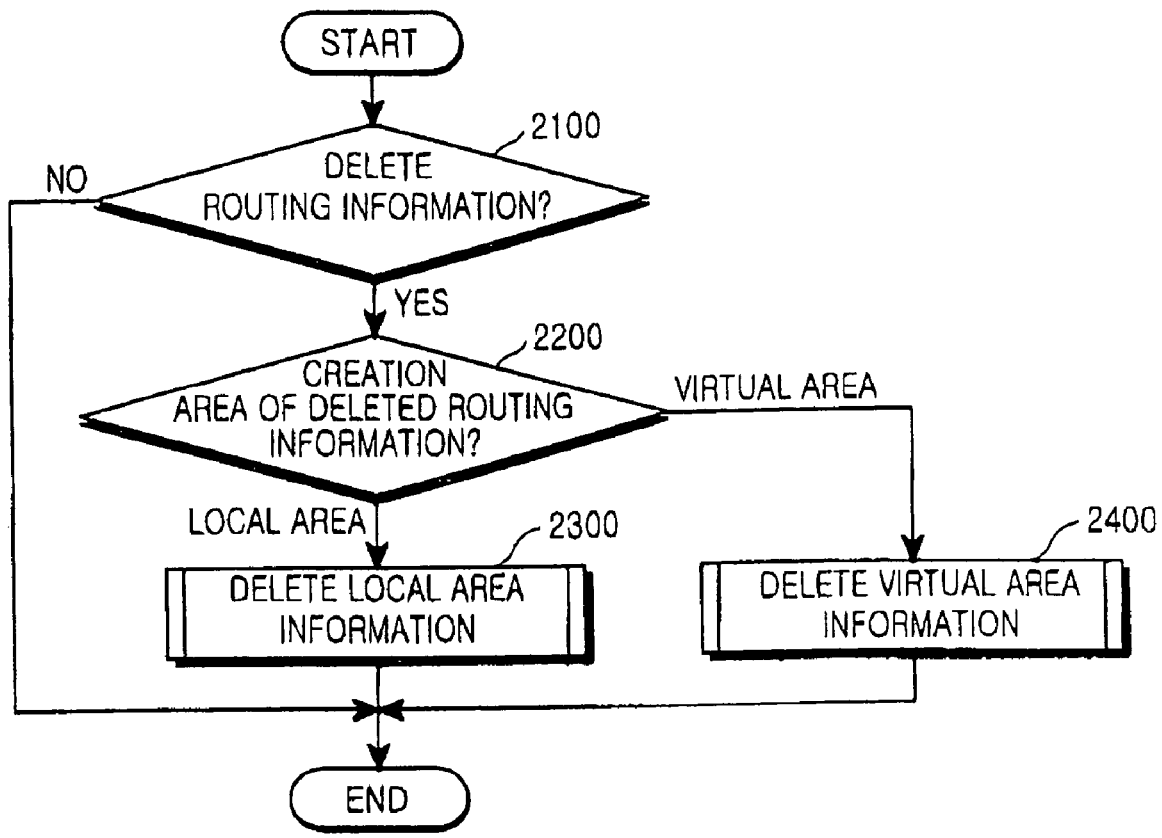
FIG. 8 is a flow chart showing a method for managing deleted forwarding information according to one embodiment of the present invention.

FIG. 8 is a flow chart showing a method for managing deleted forwarding information according to one embodiment of the present invention. Referring to FIG. 8, in a router having a distributed architecture including a plurality of routing nodes, if forwarding information of a predetermined routing node is deleted step 2100, in step 2200 the predetermined routing node determines whether or not the deleted forwarding information had been created in the local area of the routing node, by extracting node information corresponding to forwarding information that was deleted in step 2100 from a predetermined aggregation tree. In step 2200, it is preferred to check whether or not the address information for the forwarding information is a private IP address in the same manner as in step 1300 shown in FIG. 5, in order to identify the creation area of the deleted forwarding information. For instance, if forwarding information deleted in step 210 had a private IP address, it is determined that forwarding information was created in the virtual area. In addition, if forwarding information deleted in step 2100 does not have a private IP address, it is determined that forwarding information was created in the local area.

Based on the result of the determination in step 2200, the forwarding information deleted in step 2100 is treated in the routing table on the basis of its creation area. That is, if forwarding information deleted in step 2100 was created in the local area, a local area information deletion procedure is carried out in step 2300. In addition, if the forwarding information deleted in step 2100 was created in the virtual area, a virtual area information deletion procedure is carried out in step 2400.

Figure 9:
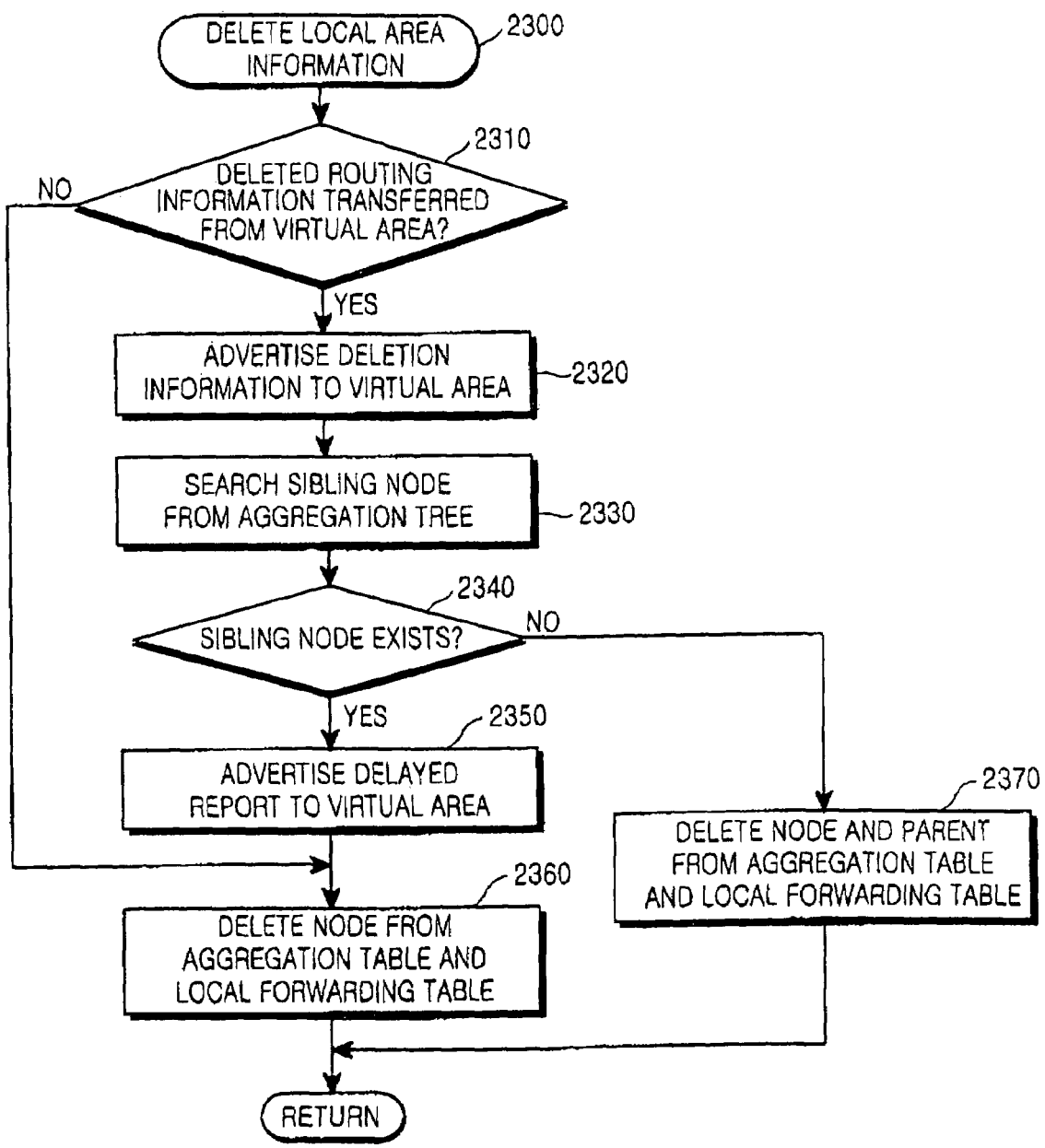
FIG. 9 is a flow chart showing a procedure for deleting local area information according to one embodiment of the present invention.
Figure 10:
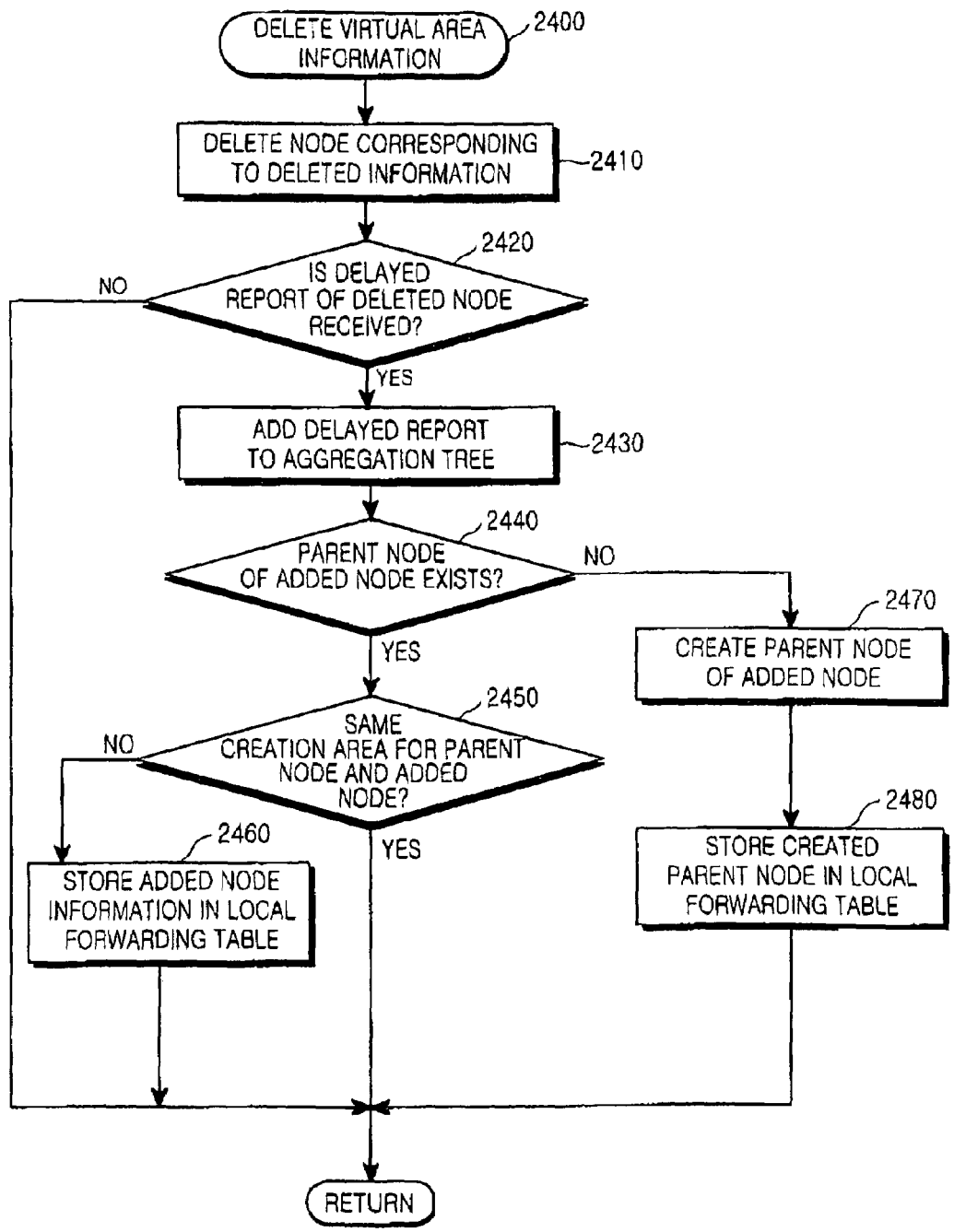
FIG. 10 is a flow chart showing a procedure for deleting virtual area information according to one embodiment of the present invention.

FIGS. 9 and 10 are flow charts showing procedures for deleting local area information and virtual area information, respectively.

Referring to FIGS. 8 and 9, the local area information deletion step 2300 includes a step 2310 of checking whether or not forwarding information deleted in step 210 is advertised to the virtual area. Based on the result in step 2310, it is determined whether or not the deletion of forwarding information should be advertised to the virtual area. If the forwarding information that was deleted in step 2100 had been created in the local area of the routing node and the forwarding information was advertised to the other routing nodes, then in step 2320 the deletion information about the forwarding information deleted in step 2100 is advertised to the other routing nodes.

Then, in step 2330 a search is made to identify any sibling node of the node to be deleted that corresponds to the deleted information from the aggregation tree in order to perform a disaggregation. If the sibling node of the node to be deleted is found in step 2340 to exist in the aggregation tree, in step 2350 sibling node information is advertised to other routing nodes. That is, in step 2350, the virtual area is notified of the sibling node information. At this time, since sibling node information is advertised to the virtual area after the deletion information about the node to be deleted has been advertised to the virtual area, the sibling node information is called a "delayed report". After the deletion information about the forwarding information that was deleted in step 2100 has been transmitted to the virtual area, in step 2360 the node is deleted from the corresponding aggregation tree and the local forwarding table of the routing node.

In addition, in step 2330, if the node to be deleted is found to have no sibling node, in step 2370 the node and the parent of that sibling node are deleted from the aggregation tree and the local forwarding table.

FIG. 10 is a flow chart showing the procedure for deleting virtual area information during step 2400, according to one embodiment of the present invention.

Referring to FIGS. 8 and 10, the virtual area information deletion procedure in step 2400 includes a step 2410 for deleting a node corresponding to the deleted forwarding information from the aggregation tree. Then, if the sibling node information (i.e., the delayed report) of the node deleted from the virtual area is received in step 2420, in step 2430 the sibling node is added to the aggregation node. That is, the disaggregation is carried out by means of the sibling node information (i.e., by the delayed report). In addition, a check is made in step 244 to determine whether or not the parent node of the sibling node added to the aggregation tree in step 2430 exists in the aggregation tree, and a determination is made in step 2450 of whether or not the sibling node added to the aggregation tree in step 2430 and the parent node of that sibling node are created from the same routing node, thereby determining whether or not it is required to store the node information added to the aggregation tree in step 2430 in the local forwarding table.

For example, as a result of steps 2440 and 2450, if the parent node of the sibling node added to the aggregation tree in step 2430 exists in the aggregation tree, and if the sibling node added to the aggregation tree in step 2430 and the parent node of that sibling node are created from the same routing node, the node information added to the aggregation tree in step 2430 is not stored in the local forwarding table of the routing node.

In addition, as a result of steps 2440 and 2450, if the parent node of the sibling node added to the aggregation tree in step 2430 exists in the aggregation tree, and if the sibling node added to the aggregation tree in step 2430 and its parent node are created from different routing nodes, during step 2460 node information added to the aggregation tree in step 2430 is stored in the local forwarding table of the routing node.

In addition, as a result of step 2440, if the parent node of the sibling node added to the aggregation tree in step 2430 does not exist in the aggregation tree, the parent node of the sibling node added to the aggregation tree in step 2430 is created in step 2470. Then, in step 2480 the parent node is stored in the local forwarding table of the routing node. The procedure for creating the parent node has been described with reference to step 1440 shown in FIG. 6, and need not be again described below.

Figure 11A:
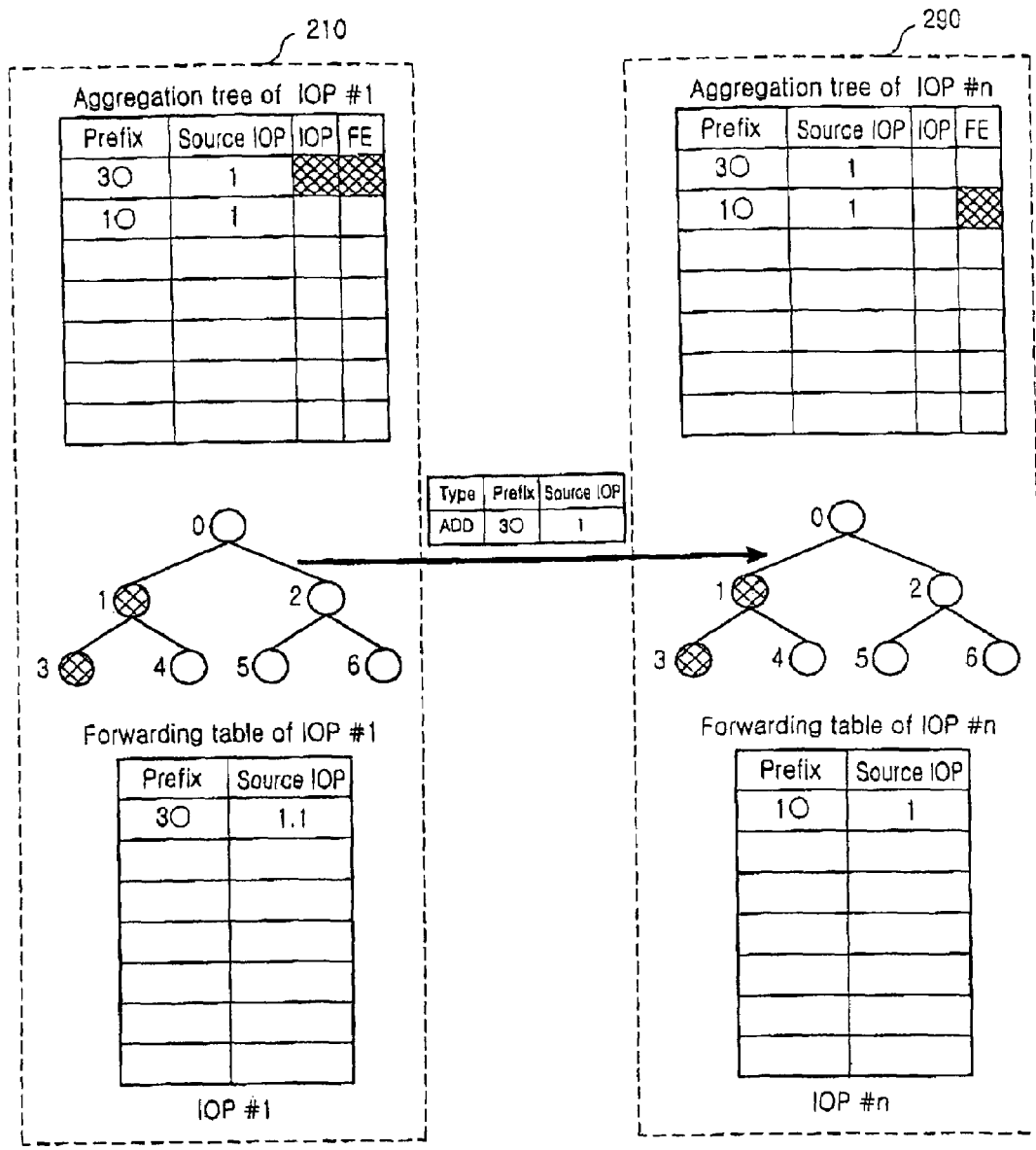
FIGS. 11A and 11B are schematic views showing a method for managing newly added forwarding information.
Figure 11B:
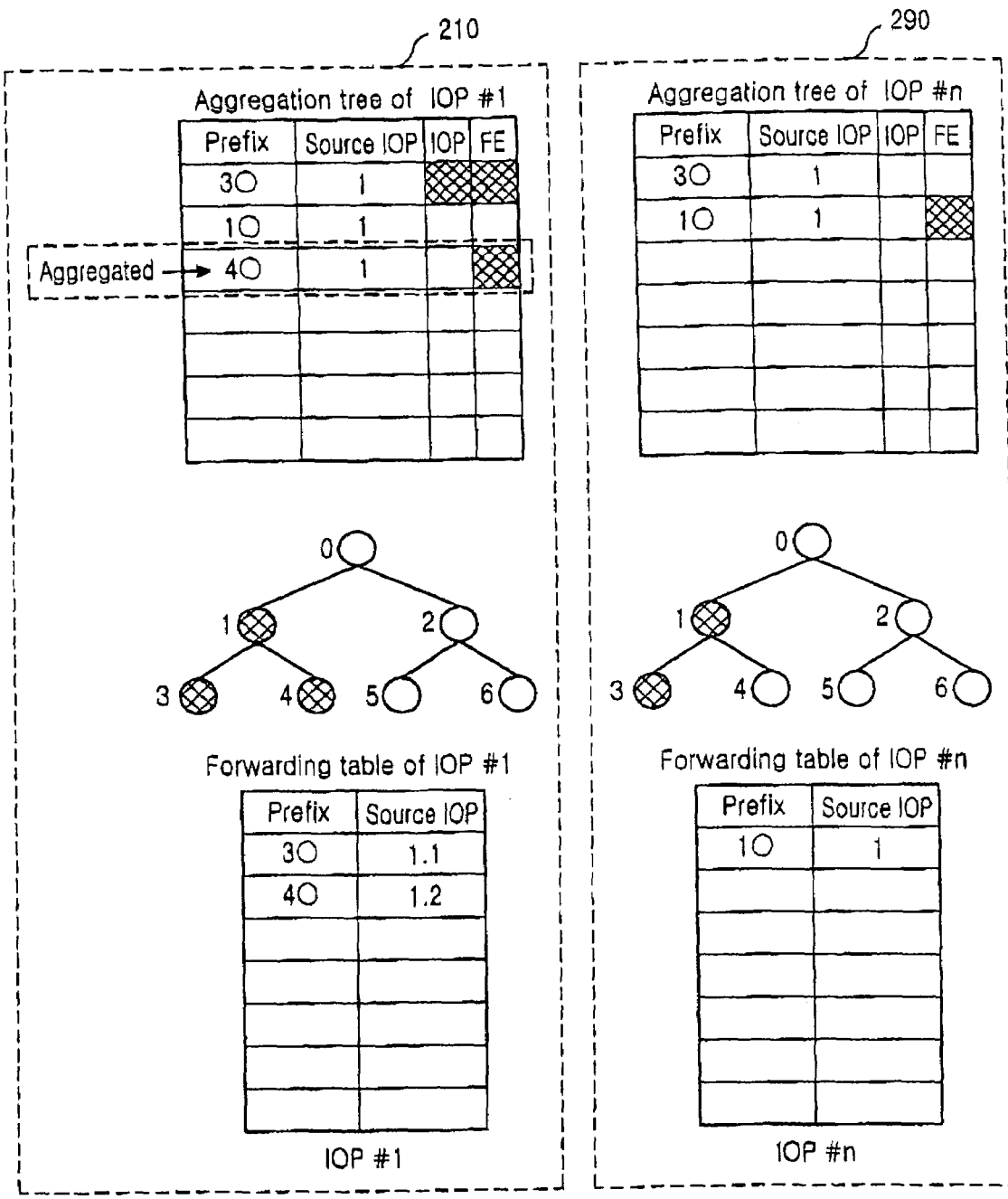

FIGS. 11A and 11B are schematic views showing a method for managing routing information newly added to the routing table. Referring to FIG. 11A, when new forwarding information having a forwarding address (i.e., a prefix) of "3" is added to IOP#1 210, new forwarding information is added to the aggregation tree and the forwarding table of the IOP#1, and is advertised to routing node IOP#n. Referring to FIG. 11B, when new forwarding information having a forwarding address (i.e., a prefix) of "4" is added to the IOP#1 210, the new forwarding information is added to the aggregation tree and to the forwarding table for the IOP#1.

In FIGS. 11A and 11B, the cross-hatched portion in an IOP area of the aggregation tree indicates that forwarding information has been advertised to the virtual area, and a cross-hatched portion of an FE area represents that the forwarding information is stored in the local forwarding table.

Referring to FIG. 11A, when new forwarding information having a forwarding address (i.e., a prefix) of "3" is added to IOP#1 210 in a state that IOP#1 210 has no other information registered therein, a control section of IOP#1 210 adds new forwarding information to the aggregation tree and the forwarding table of IOP#1 210, and creates a virtual parent node having a forwarding address (i.e., a prefix) of "1". At this time, since the node having the forwarding address (i.e., a prefix) of "3" and the node having the forwarding address (i.e., a prefix) of "1" are created from IOP#1 210, "1" is displayed in the source IOP areas of the aggregation tree. In addition, IOP#1 210 advises IOP#n 290 about the new forwarding information added to the aggregation tree and the forwarding table of IOP#1 210. At this time, node information having the forwarding address (i.e., the prefix) of "3" is stored in the forwarding table of IOP#1 210.

In addition, IOP#n 290, which is notified by IOP#1 210 that the new forwarding information is added to the aggregation tree and to the forwarding table of IOP#1 210, creates a node having the forwarding address (and prefix) of "3" and the node having the forwarding address (and prefix) of "1", and stores the nodes in the aggregation tree of IOP#n 290. Since both the node having the forwarding address (i.e., the prefix) of "3" and the node having the forwarding address (i.e., a prefix) of "1" are firstly created from IOP#1 210, "1" is displayed in a source IOP area of IOP#n 290. Node information having the forwarding address (i.e., a prefix) of "1" however, is stored in the forwarding table of IOP#n 290. A node having the forwarding address (i.e., a prefix) of "1" is a parent node of a node having the forwarding address (i.e., a prefix) of "1". Accordingly, these results represent that forwarding information for a node having a forwarding address (i.e., a prefix) of "3" is transferred to IOP#n 290 from the virtual area.

Referring to FIG. 11B, when forwarding information having a forwarding address (i.e., a prefix) of "4" is added to the IOP#1 210 after forwarding information having a forwarding address (i.e., a prefix) of "3" has been added to the IOP#1 210, an aggregation is carried out with respect to forwarding information so that there is no requirement to advertise forwarding information having a forwarding address (i.e., a prefix) of "4" to IOP#n 290. Accordingly, interface devices connected to the local area of IOP#n 290 are moved to IOP#1 210 based on the information in the forwarding table of IOP#n 290, so that routing to interface devices having a forwarding address (i.e., a prefix) of "3" or "4" is possible based on the information in the forwarding table of the IOP#1 210.

Figure 12A:
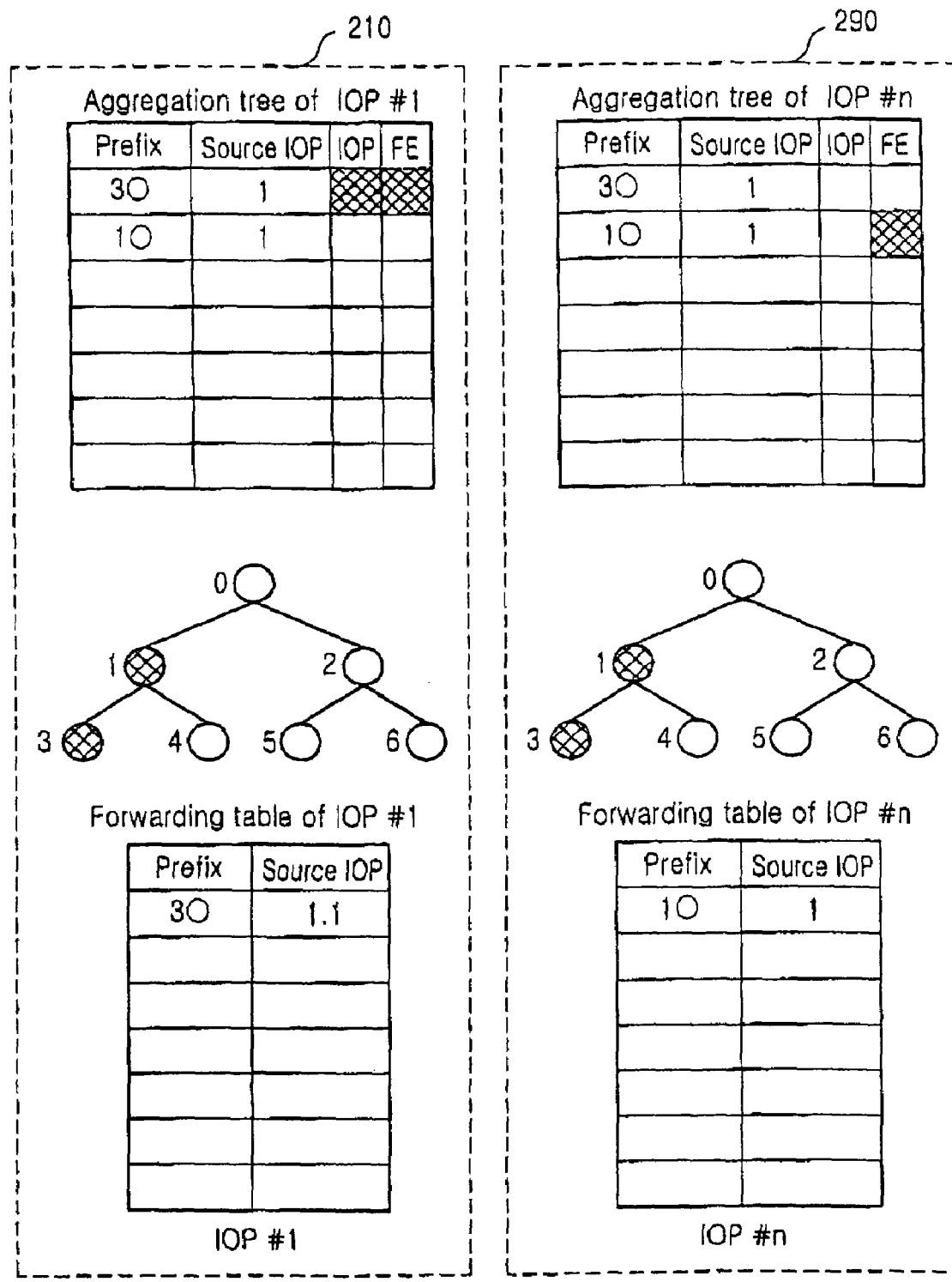
FIGS. 12A and 12B are schematic views showing a method for managing deleted forwarding information.
Figure 12B:
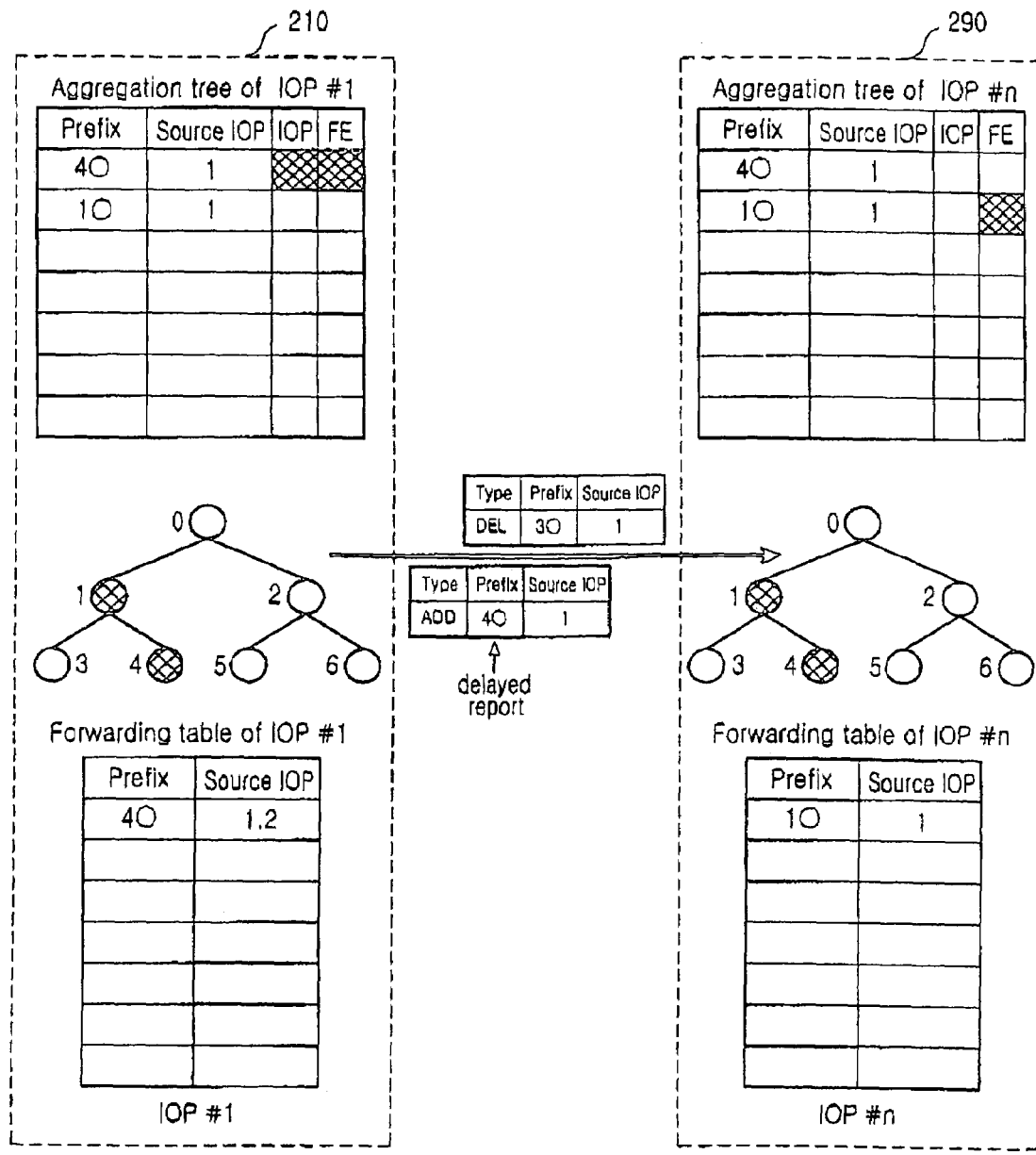

FIGS. 12A and 12B are schematic views showing a method for managing routing information deleted from the routing table.

Referring to FIG. 12A, when the forwarding information with a forwarding address (i.e., a prefix) of "3" and the forwarding information having a forwarding address (i.e., a prefix) of "4" are connected to the local area of IOP#1 210, forwarding information having a forwarding address (i.e., a prefix) of "4" is deleted from the local area. In FIG. 11B, forwarding information with a forwarding address (i.e., a prefix) of "4" is not advertised to the virtual area, so the deleted forwarding information is only applied to the aggregation tree and the forwarding table of the IOP#1 210 in FIG. 12B. That is, there is no requirement to advertise deleted forwarding information to the virtual area.

Referring to FIG. 12B, when forwarding information with a forwarding address (i.e., a prefix) of "3" and forwarding information with a forwarding address (i.e., a prefix) of "4" are connected to the local area of IOP#1 210, forwarding information having a forwarding address (i.e., a prefix) of "3" is deleted from the local area. In FIG. 11B, forwarding information having a forwarding address (i.e., a prefix) of "3" is advertised to the virtual area, so it is required to advertise the deleted forwarding information to IOP#n 290 through the virtual area. In addition, the aggregation tree of IOP#1 210 is searched to identify any sibling node of a node having a forwarding address (i.e., a prefix) of "3" in order to provide information about the sibling node, which has a forwarding address (i.e., a prefix) of "4", to IOP#n 290 as a delayed report.

Upon receiving the delayed report, IOP#n 290 deletes forwarding information with a forwarding address (i.e., a prefix) of "3" and newly added forwarding information with a forwarding address (i.e., a prefix) of "4" thereto.

FIGS. 13A through 13D are two coordinate graphs showing test results representing the effect of a dynamic management method for forwarding information according to one embodiment of the present invention.

In order to obtain the above test results, 53,000 routing entries are added by using a galaxy system including one SWM switch module and two IOPs routing nodes, and a routing table entry for a core BGP router available from a site (such as http://bgp.potaro.net/), and a predetermined proportion of the routing entries are flapped.

Figure 13A:
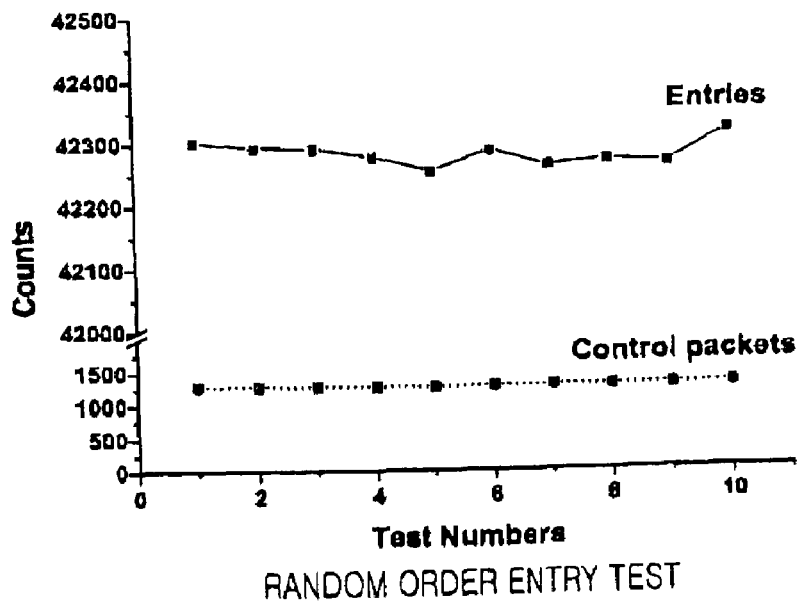
FIGS. 13A through 13D are views showing test results representing the effects of a dynamic management method for forwarding information according to one embodiment of the present invention.

FIG. 13A is a two coordinate graph showing test results for checking whether or not the aggregation effect is affected by the order of the entries to be added. Sample entries aligned in an ascending order are added while randomly changing the order of the sample entries about ten times. Referring to FIG. 13A, a difference between a maximum number and a minimum number of control packets is less than ten, and the number of the forwarding entries is less than sixty. Accordingly, it is understood from these test results that the aggregation effect attained by the present invention is rarely affected by the order of the entries to be added.

Figure 13B:
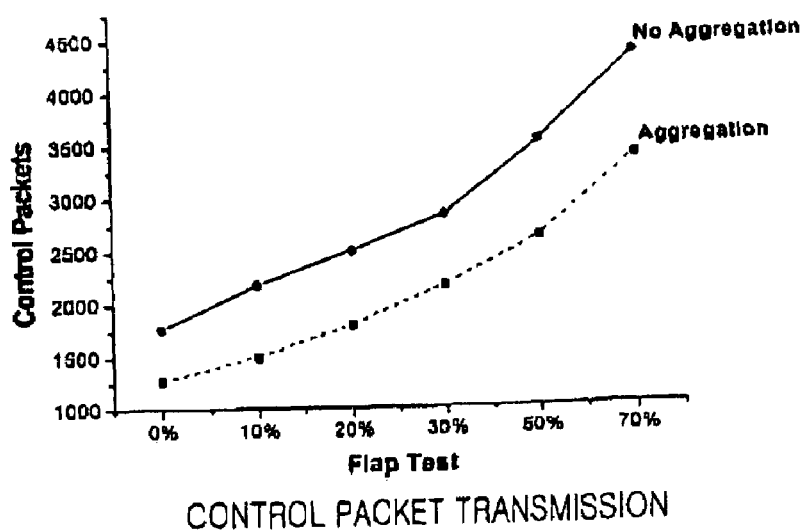

FIG. 13B is a two-coordinate graph showing the measured results of transmission of control packets, which are transmitted for synchronizing routing tables between IOPs, while flapping 53,000 BGP routing entries from 0% to 70%. Referring to FIG. 13B, when the aggregation effect of the present invention is applied, the number of control packets is reduced by approximately, 24 to 32% of the control packets.

Figure 13C:
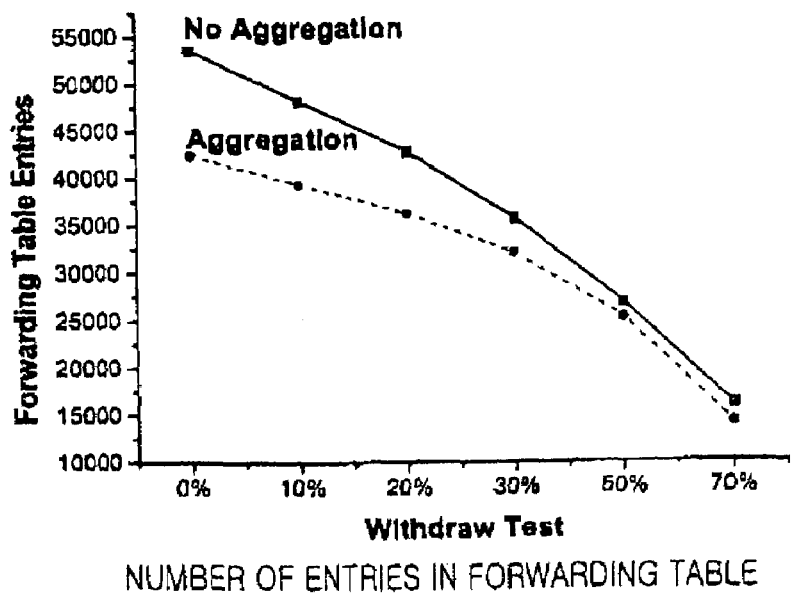

FIG. 13C is a two coordinate graph showing the measured results of the number of forwarding entries remaining in the forwarding table while withdrawing 0% to 70% of 53,000 core BGP routing entries. Referring to FIG. 13C, when the aggregation effect of the present invention is applied, the number of forwarding entries is reduced by approximately, 20% of the forwarding entries.

Figure 13D:
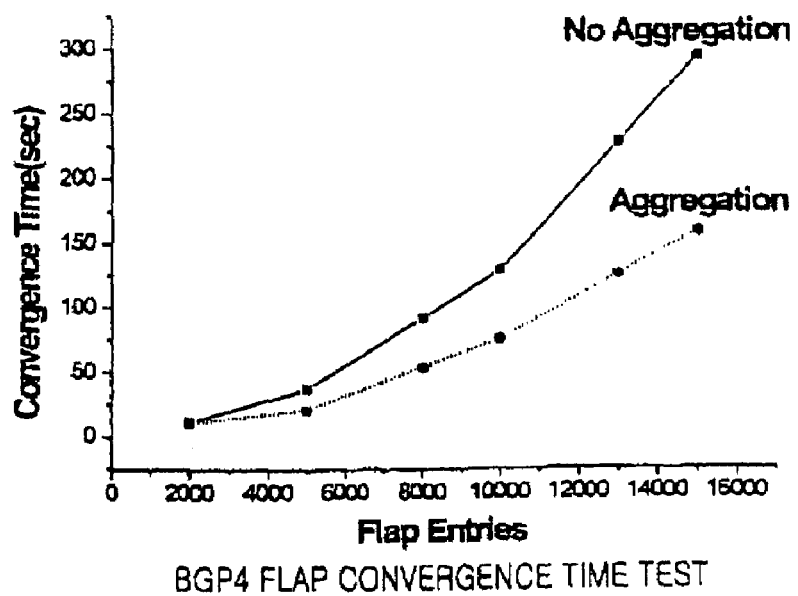

FIG. 13D is a two coordinate graph showing convergence time as a function of the number of flap entries. Referring to FIG. 13D, when the aggregation effect of the present invention is applied, the convergence time is noticeably shortened.

FIGS. 14A through 14J are views showing algorithms of a dynamic management method suitable for forwarding information according to one embodiment of the present invention. FIG. 14A represents an algorithm of a procedure for dynamically adding forwarding information, FIG. 14B represents an algorithm of a procedure for dynamically deleting forwarding information, and FIGS. 14C through 14J represent sub-algorithms for executing the algorithms of FIGS. 14A and 14B.

As described above, according to the present invention, the aggregation or the disaggregation of forwarding information is carried out in response to the deletion or addition of forwarding information in the router having the distributed architecture, so the size of the forwarding table managed by each routing node of the router constructed with distributed architecture can be reduced. In addition, transmission of control packets, which are transmitted so as to update the forwarding table in the router with a distributed architecture, can be reduced, thereby reducing internal traffic.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing forwarding information in a router having a distributed architecture including a plurality of routing nodes, the method comprising the steps of:
   i) forming an aggregation tree corresponding to each routing node, the aggregation tree including actual nodes corresponding to forwarding information of each routing node and virtual nodes for aggregating forwarding information of each routing node;
   ii) varying the aggregation tree when forwarding information is added to each routing node;
   iii) checking a creation area of the forwarding information added to each routing node in step ii);
   iv) determining whether to advertise the forwarding information to other routing nodes by analyzing the aggregation tree and making a determination to advertise the forwarding information to the other routing nodes when the forwarding information was created in a local area of a predetermined routing node;
   v) advertising the forwarding information to the other routing nodes and storing the forwarding information in a local forwarding table of the predetermined routing node when the determination is made in step iv) to advertise the forwarding information to other routing nodes;
   vi) determining whether to store the forwarding information in the local forwarding table of the predetermined routing node by analyzing the aggregation tree and making a determination to store the forwarding information in the forwarding table of the predetermined routing node when the forwarding information was not created in a local area of the predetermined routing node; and
   vii) storing forwarding information in the local forwarding table of the predetermined routing node based on the determination in step vi).

2. The method as claimed in claim 1, wherein, in step i), a prefix, which is address information for receiving forwarding information corresponding to each node of the aggregation tree, length information about the prefix, a type of forwarding information, information of a source IOP creating forwarding information, an IOP flag for notifying whether or not forwarding information is advertised to other routing nodes, and an FT flag for notifying whether or not forwarding information is stored in the local forwarding table are stored as a property of the node of the aggregation tree.

3. The method as claimed in claim 2, wherein step i) includes the substeps of checking a creation area of forwarding information, determining the type of forwarding information depending on a sort of processors creating forwarding information when forwarding information is created from the local area, and storing virtual type forwarding information as the type of forwarding information if forwarding information is created from a virtual area.

4. The method as claimed in claim 3, wherein step i) includes the substeps of determining that forwarding information is transferred from the virtual area if the prefix of the forwarding information is a private IP (Internet protocol) address by analyzing the prefix, and determining that forwarding information is created from the local area if the prefix of the forwarding information is not the private IP address.

5. The method as claimed in claim 2, further comprising a step of varying a first flag (IOP flag) and a second flag (FT flag) of the node according to a result achieved through performing at least one of steps v) to vii).

6. The method as claimed in claim 1, wherein step ii) includes the substeps of adding a node corresponding to added forwarding information to the aggregation tree, and storing a property of the node added to the aggregation tree based on a prefix and creation area information of added forwarding information.

7. The method as claimed in claim 6, wherein, in step ii), the prefix, which is address information for receiving forwarding information corresponding to each node of the aggregation tree, length information about the prefix, a type of forwarding information, information of a source IOP creating forwarding information, an IOP flag for notifying whether or not forwarding information is advertised to other routing nodes, and an FT flag for notifying whether or not forwarding information is stored in the local forwarding table are stored as the property of the node of the aggregation tree.

8. The method as claimed in claim 7, wherein step ii) includes the substeps of checking a creation area of forwarding information, determining the type of forwarding information depending on a sort of processors creating forwarding information when forwarding information is created from the local area, and storing virtual type forwarding information as the type of forwarding information if forwarding information is created from a virtual area.

9. The method as claimed in claim 8, wherein step ii) includes the substeps of determining that forwarding information is transferred from the virtual area if the prefix of the forwarding information is a private IP (Internet protocol) address by analyzing the prefix, and determining that forwarding information is created from the local area if the prefix of the forwarding information is not the private IP address.

10. The method as claimed in claim 8, wherein step iii) includes the substeps of extracting the type of forwarding information corresponding to the node added to the aggregation tree in step ii) by analyzing the property of the node, and checking the creation area of forwarding information corresponding to the node based on the type of forwarding information.

11. The method as claimed in claim 1, wherein step iv) includes the substeps of:
a) checking whether or not a parent node of the node added to the aggregation tree in step ii) exists in the aggregation tree; and
b) checking whether or not the node added to the aggregation tree in step ii) and the parent node thereof are created from a same routing node if the parent node exists in the aggregation tree.

12. The method as claimed in claim 11, wherein, in step v), forwarding information corresponding to the node added to the aggregation tree in step ii) is stored in the local forwarding table of the corresponding routing node without advertising forwarding information corresponding to the node added to the aggregation tree in step ii) to other routing nodes if the node and the parent node thereof are created from the same routing node.

13. The method as claimed in claim 11, wherein, in step v), forwarding information corresponding to the node added to the aggregation tree in step ii) is stored in the local forwarding table of the corresponding routing node after advertising forwarding information corresponding to the node added to the aggregation tree in step ii) to other routing nodes if the node and the parent node thereof are created from different routing nodes.

14. The method as claimed in claim 11, wherein, in step v), if the aggregation tree has no parent node of the node added to the aggregation tree in step ii), the parent node of the node is created, and forwarding information corresponding to the node added to the aggregation tree in step ii) is stored in the local forwarding table of the corresponding routing node after advertising forwarding information to other routing nodes.

15. The method as claimed in claim 14, wherein, in step v), a node having a prefix, which is determined by excepting a lowermost 1 bit value from the prefix of the node added to the aggregation tree in step ii), is created as the parent node of the node added to the aggregation tree in step ii).

16. The method as claimed in claim 1, wherein step vi) includes the substeps of:
a) checking whether or not a parent node of the node added to the aggregation tree in step ii) exists in the aggregation tree; and
b) checking whether or not the node added to the aggregation tree in step ii) and the parent node thereof are created from a same routing node if the parent node exists in the aggregation tree.

17. The method as claimed in claim 16, wherein, in step vii), forwarding information corresponding to the node added to the aggregation tree in step ii) is stored in the local forwarding table of the corresponding routing node if the node and the parent node thereof are created from different routing nodes.

18. The method as claimed in claim 16, wherein, in step vii), if the aggregation tree has no parent node of the node added to the aggregation tree in step ii), the parent node of the node is created and stored in the local forwarding table of the corresponding routing node.

19. The method as claimed in claim 18, wherein, in step vii), a node having a prefix, which is determined by excepting a lowermost 1 bit value from the prefix of the node added to the aggregation tree in step ii), is created as the parent node of the node added to the aggregation tree in step ii).

20. A method for managing forwarding information in a router having a distributed architecture including a plurality of routing nodes, the method comprising the steps of:
i) forming an aggregation tree corresponding to each routing node, the aggregation tree including actual nodes corresponding to forwarding information of each routing node and virtual nodes for aggregating forwarding information of each routing node;
ii) analyzing the aggregation tree of each routing node in response to a deletion of forwarding information in each routing node and checking a creation area of deleted forwarding information;
iii) advertising the deletion of forwarding information to other routing nodes only when the forwarding information deleted is determined to have been advertised to other routing nodes after analyzing the aggregation tree to establish that the forwarding information deleted was created in a local area of the corresponding routing node, deleting the node corresponding to the forwarding information deleted from the aggregation tree, and deleting forwarding information from a local forwarding table of the corresponding routing node; and
iv) deleting the node corresponding to the forwarding information from the aggregation tree when the forwarding information deleted was not created from the local area of the corresponding routing node.

21. The method as claimed in claim 20, wherein, in step i), a prefix, which is address information for receiving forwarding information corresponding to each node of the aggregation tree, length information about the prefix, a type of forwarding information, information of a source IOP creating forwarding information, an IOP flag for notifying whether or not forwarding information is advertised to other routing nodes, and an FT flag for notifying whether or not forwarding information is stored in the local forwarding table are stored as a property of the node of the aggregation tree.

22. The method as claimed in claim 21, wherein step i) includes the substeps of checking a creation area of forwarding information, determining the type of forwarding information depending on a sort of processors creating forwarding information when forwarding information is created from the local area, and storing virtual type forwarding information as the type of forwarding information if forwarding information is created from a virtual area.

23. The method as claimed in claim 22, wherein step i) includes the substeps of determining that forwarding information is transferred from the virtual area if the prefix of the forwarding information is a private IP (Internet protocol) address by analyzing the prefix, and determining that forwarding information is created from the local area if the prefix of the forwarding information is not the private IP address.

24. The method as claimed in claim 22, wherein step ii) includes the substeps of extracting the property of the node corresponding to deleted forwarding information from the aggregation tree, extracting the type of deleted forwarding information based on the property of the node, and checking the creation area of deleted forwarding information based on the type of deleted forwarding information.

25. The method as claimed in claim 20, wherein, in step iii), deletion information of forwarding information is not advertised to other routing nodes if deleted forwarding information is not advertised to other routing nodes, and forwarding information is deleted from the local forwarding table of the corresponding node after deleting the node corresponding to deleted forwarding information from the aggregation tree.

26. The method as claimed in claim 20, wherein step iii) includes the substeps of:
a) checking whether or not a sibling node of the node corresponding to deleted forwarding information exists in the aggregation tree by analyzing the aggregation tree; and
b) advertising information of the sibling node to other routing nodes if the sibling node of the node corresponding to deleted forwarding information exists in the aggregation tree.

27. The method as claimed in claim 26, wherein step iii) further comprises a step of deleting a parent node of the node corresponding to deleted forwarding information from the aggregation tree when the aggregation tree has no sibling node of the node corresponding to deleted forwarding information.

28. The method as claimed in claim 20, wherein step iv) includes the substeps of:
a) adding a sibling node of the node corresponding to deleted forwarding node to the aggregation tree when information of the sibling node is transferred from a routing node creating deleted forwarding information; and
b) storing sibling node information in the local forwarding table of the corresponding routing node by analyzing the aggregation tree.

29. The method as claimed in claim 20, wherein substep b) includes the steps of:

c) checking whether or not a parent node of the sibling node added to the aggregation tree in substep a) exists in the aggregation tree;
d) checking whether or not the sibling node added to the aggregation tree in substep a) and the parent node thereof are created from a same routing node when the parent node exists in the aggregation tree; and
e) storing forwarding information corresponding to the sibling node added to the aggregation tree in substep a) in the local forwarding table of the corresponding routing node if the sibling node added to the aggregation tree in substep a) and the parent node thereof are created from different routing nodes.

30. The method as claimed in claim 20, wherein, in substep b), if the aggregation tree has no parent node of the sibling node added to the aggregation tree in substep a), the parent node of the sibling node is created and stored in the local node of the corresponding routing node.

31. The method as claimed in claim 30, wherein a node having a prefix, which is determined by excepting a lowermost 1 bit value from the prefix of the node added to the aggregation tree in step a), is created as the parent node of the sibling node added to the aggregation tree in step a).

32. A method for managing the forwarding information, comprising the steps of:
forming in a router constructed with a distributed architecture including a plurality of routing nodes, an aggregation tree corresponding to each routing node, with the aggregation tree including actual nodes corresponding to forwarding information for each of the routing nodes and virtual nodes for aggregating forwarding information of each of the routing nodes;
varying the aggregation tree when forwarding information is added to each of the routing nodes;
identifying a creation area of forwarding information added to each of the routing nodes;
analyzing the aggregation tree, advertising to other routing nodes the forwarding information added, and storing forwarding information in a local forwarding table of a corresponding routing node when the forwarding information added is created from a local area of the corresponding routing node; and
storing forwarding information in the local forwarding table of the corresponding routing node based when the forwarding information added is not created from the local area of the corresponding routing node.

33. A method for managing the forwarding information, comprising the steps of:
forming in a router constructed with a distributed architecture including a plurality of routing nodes, an aggregation tree corresponding to each routing node, with the aggregation tree including actual nodes corresponding to forwarding information for each of the routing nodes and virtual nodes for aggregating forwarding information of each of the routing nodes;
analyzing the aggregation tree of each of the routing nodes in response to a deletion of forwarding information in each routing node;
determining a creation area of the forwarding information deleted from an aggregation tree;
advertising to other routing nodes, the deletion of the forwarding information deleted only when the forwarding information deleted had been advertised to other routing nodes by:
analyzing the aggregation tree for the routing node corresponding to the forwarding information deleted when the forwarding information deleted had been created from a local area of the corresponding routing node, deleting one of an actual node and a virtual node corresponding to the forwarding information deleted from the aggregation tree, and deleting the forwarding information deleted from a local forwarding table of the corresponding routing node; and deleting one of an actual node and a virtual node corresponding to the forwarding information deleted from the aggregation tree when the forwarding information deleted was not created from the local area of the corresponding routing node.

* * * * *